US009222581B2

(12) United States Patent
Koga et al.

(10) Patent No.: US 9,222,581 B2
(45) Date of Patent: Dec. 29, 2015

(54) CONTINUOUSLY VARIABLE TRANSMISSION CONTROL SYSTEM FOR VEHICLE AND WORK VEHICLE

(71) Applicant: Kanzaki Kokyukoki Mfg. Co., Ltd., Hyogo (JP)

(72) Inventors: Kazunari Koga, Hyogo (JP); Minoru Kamada, Hyogo (JP); Tomoyuki Ebihara, Hyogo (JP)

(73) Assignee: KANZAKI KOKYUKOKI MFG. CO., LTD. (JP)

( * ) Notice: Subject to any disclaimer, the term of this patent is extended or adjusted under 35 U.S.C. 154(b) by 10 days.

(21) Appl. No.: 14/193,701

(22) Filed: Feb. 28, 2014

(65) Prior Publication Data

US 2014/0243125 A1 Aug. 28, 2014

(30) Foreign Application Priority Data

Feb. 28, 2013 (JP) .................................. 2013-039150
Feb. 28, 2013 (JP) .................................. 2013-039152

(51) Int. Cl.
*F16H 9/12* (2006.01)
*F16H 63/06* (2006.01)
*F16H 61/662* (2006.01)

(52) U.S. Cl.
CPC ........ *F16H 63/062* (2013.01); *F16H 61/66259* (2013.01)

(58) Field of Classification Search
None
See application file for complete search history.

(56) References Cited

U.S. PATENT DOCUMENTS

| 6,671,602 B1 * | 12/2003 | Speicher et al. ................ 701/52 |
| 2001/0044349 A1 * | 11/2001 | Tanigawa et al. ................ 474/8 |
| 2005/0250606 A1 * | 11/2005 | Shioiri et al. .................. 474/18 |

FOREIGN PATENT DOCUMENTS

| JP | 9329232 A | 12/1997 |
| JP | 200374446 A | 3/2003 |
| JP | 200536855 A | 2/2005 |

* cited by examiner

*Primary Examiner* — Edwin A Young
(74) *Attorney, Agent, or Firm* — Cantor Colburn LLP

(57) ABSTRACT

A continuously variable transmission control system includes a continuously variable transmission device having an electricity-driven actuator that changes an width between a moveable sheave and a fixed sheave in at least one pulley of a drive pulley and a driven pulley, and a control device that controls driving of the electricity-driven actuator. The control device selects, from a plurality of speed relationships, each of which is a relationship between an input shaft rotational speed of the drive pulley and an output shaft rotational speed of the driven pulley, one speed relationship according to an input of a switch command signal or a drive state of the vehicle, and changes the width between the moveable sheave and the fixed sheave based on the selected speed relationship and detected values of the input shaft rotational speed and the output shaft rotational speed.

13 Claims, 18 Drawing Sheets

CONTINUOUSLY VARIABLE TRANSMISSION CONTROL SYSTEM FOR VEHICLE AND WORK VEHICLE

PRIORITY INFORMATION

The entire disclosures of Japanese Patent Application Nos. 2013-39150 and 2013-39152, both filed on Feb. 28, 2013, including specification, claims, drawings, and abstract, are incorporated herein by reference in their entirety.

BACKGROUND

1. Technical Field

The present invention relates to a continuously variable transmission control system for a vehicle having a continuously variable transmission device having a belt suspended between two pulleys and an electricity-driven actuator, and a control device that controls driving of the electricity-driven actuator, and to a work vehicle.

2. Related Art

In the related art, a structure is known in which a belt type continuously variable transmission device is incorporated in a motive power transmitting mechanism that transmits a motive power of a motive power source of a vehicle to a wheel. In the belt type continuously variable transmission device, a belt is suspended between a drive pulley on the side of the motive power source in the motive power transmission direction and a driven pulley on the side of the wheel. Of the drive pulley and the driven pulley, at least one pulley includes a fixed sheave and a moveable sheave which is moveable in an axial direction with respect to the fixed sheave. As the belt type continuously variable transmission device, there are known a hydraulic structure in which the moveable sheave is hydraulically moved, a mechanical structure in which the moveable sheave is moved by a pressurization force generation mechanism including a torque cam, and an electrically-driven structure in which the moveable sheave is moved by an electricity-driven actuator, and also, a combination of these structures.

JP H9-329232 A discloses an electricity-driven continuously variable transmission device which includes a cam member connected to a transmission lever, an electric motor which assists an operation force of the transmission lever, and a controller for controlling the electric motor.

JP 2005-36855 A discloses a belt type continuously variable transmission device of a combination type of electric and hydraulic structures and using a ball screw-type actuator.

JP 2003-74446 A discloses an engine startup system for motorcycles having a centrifugal clutch including a drive unit which is connected to a crank shaft of an engine and a driven unit which is connected to the drive unit at a predetermined rotational speed or greater of the drive unit, and a belt type continuously variable transmission device having a drive pulley connected to the driven unit.

As a first problem, when the moveable sheave is to be moved with a mechanical structure including a torque cam in the belt type continuously variable transmission device incorporated into a vehicle, in order to allow switching among a plurality of speed relationships which are relationships of rotational speeds of the drive pulley and the driven pulley, it is necessary to allow switching with a plurality of types of torque cam mechanisms. In this case, the structure becomes complex, and the cost may be increased.

As a second problem, in a vehicle in which the belt type continuously variable transmission device is incorporated, when a brake pedal is operated to command braking after an acceleration pedal is set to a non-operation state, a deviation may occur between the rotational speed of the driven pulley on the side of the wheel and the rotational speed of the drive pulley on the side of the motive power source. In this case, in a structure in which the centrifugal clutch is provided between the motive power source and the drive pulley, due to the cutting of the motive power transmission by the centrifugal clutch, friction between each sheave of the drive pulley and the belt may be reduced and wearing of the belt may be reduced. However, such a configuration requires the centrifugal clutch, which may cause an increase in the number of components and an increase in the manufacturing cost.

At least one advantage of the present invention is in the provision of a continuously variable transmission control system for a vehicle and a work vehicle which can switch among a plurality of speed relationships with regard to the rotational speeds of the drive pulley and the driven pulley, without requiring the switching structure of a plurality of torque cam mechanisms.

At least another advantage of the present invention is in the provision of a continuously variable transmission control system for a vehicle which can reduce wearing of the belt without requiring the centrifugal clutch.

SUMMARY

According to a first aspect of the present invention, there is provided a continuously variable transmission control system for a vehicle, comprising: a continuously variable transmission device having a belt, that is suspended between a drive pulley on a side of a motive power source and a driven pulley on a side of a wheel, and an electricity-driven actuator, at least one pulley, of the drive pulley and the driven pulley, including a fixed sheave and a moveable sheave placed to be moveable with respect to the fixed sheave, and the electricity-driven actuator changing an width between the moveable sheave and the fixed sheave by movement of the moveable sheave; a control device that controls driving of the electricity-driven actuator; an input rotation detection unit that detects an input shaft rotational speed of the drive pulley; and an output rotation detection unit that detects an output shaft rotational speed of the driven pulley, wherein the control device selects, from a plurality of speed relationships, each of which is a relationship between the input shaft rotational speed and the output shaft rotational speed, one speed relationship according to an input of a switch command signal indicating a command of switching of the speed relationship or a drive state of the vehicle, and changes the width between the moveable sheave and the fixed sheave based on the selected one speed relationship and detected values of the input shaft rotational speed and the output shaft rotational speed.

According to another aspect of the present invention, there is provided a work vehicle comprising a working member which a load is applied to with respect to traveling during work, and the continuously variable transmission control system for a vehicle according to the first aspect of the present invention, wherein the continuously variable transmission device is connected between the motive power source and the wheel in a manner to enable transmission of the motive power.

According to a second aspect of the present invention, there is provided a continuously variable transmission control system for a vehicle, comprising: a continuously variable transmission device having a belt, that is suspended between a drive pulley on a side of a motive power source and a driven pulley on a side of a wheel, and an electricity-driven actuator, at least one pulley, of the drive pulley and the driven pulley, including a fixed sheave and a moveable sheave placed to be moveable with respect to the fixed sheave, and the electricity-driven actuator changing an width between the moveable sheave and the fixed sheave by movement of the moveable sheave; a control device that controls driving of the electricity-driven actuator; and a brake command unit that transmits a brake command signal indicating a command of braking of the vehicle or maintaining the brake to the control device, wherein the control device when a brake operation unit is operated by a user, when the brake command signal is input from the brake command unit or when the brake command signal is input from the brake command unit and a preset specific condition is satisfied, sets the width between the moveable sheave and the fixed sheave to an width of greater than or equal to a predetermined width, to release pinching of the belt by the one pulley.

DESCRIPTION OF EXEMPLARY EMBODIMENTS

Figure 1:
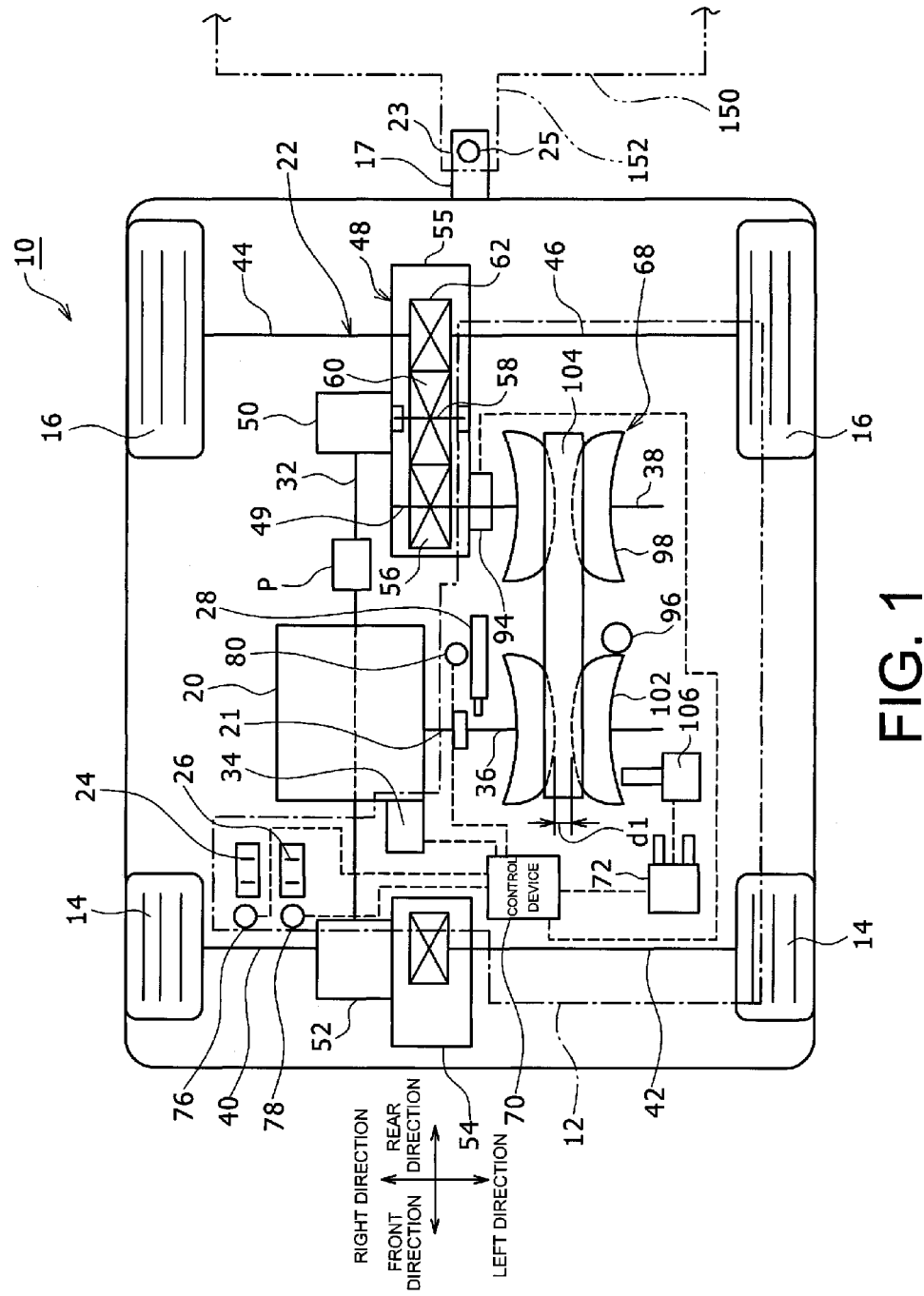
FIG. 1 is a schematic diagram showing an overall structure of a vehicle equipped with a continuously variable transmission control system for a vehicle according to a preferred embodiment of the present invention.

A preferred embodiment of the present invention will now be described in detail with reference to the drawings. In the following, a configuration will be described in which a vehicle equipped with a continuously variable transmission control system for a vehicle has a towing member which is a working member for executing towing work when necessary, but this configuration is merely exemplary. For example, the vehicle may be a vehicle which does not have the towing member, such as an off-road vehicle that travels on rough terrain such as wasteland and mountains, a work vehicle that executes one or more tasks of snow removal, excavating work, public work, and farm work, or an off-road type utility vehicle having functions of both the off-road vehicle and the work vehicle. The drive method of the vehicle may be driving of only the front wheels, or driving of only the rear wheels. In the following description, similar elements over all of the drawings are assigned the same reference numerals for the description.

(Overall Structure of Vehicle)

FIGs. 1-12 are diagrams showing a preferred embodiment of the present invention. FIG. 1 is a schematic diagram showing an overall structure of a vehicle 10 which is a work vehicle equipped with a continuously variable transmission control system 12 for a vehicle according to the present embodiment.

Figure 2:
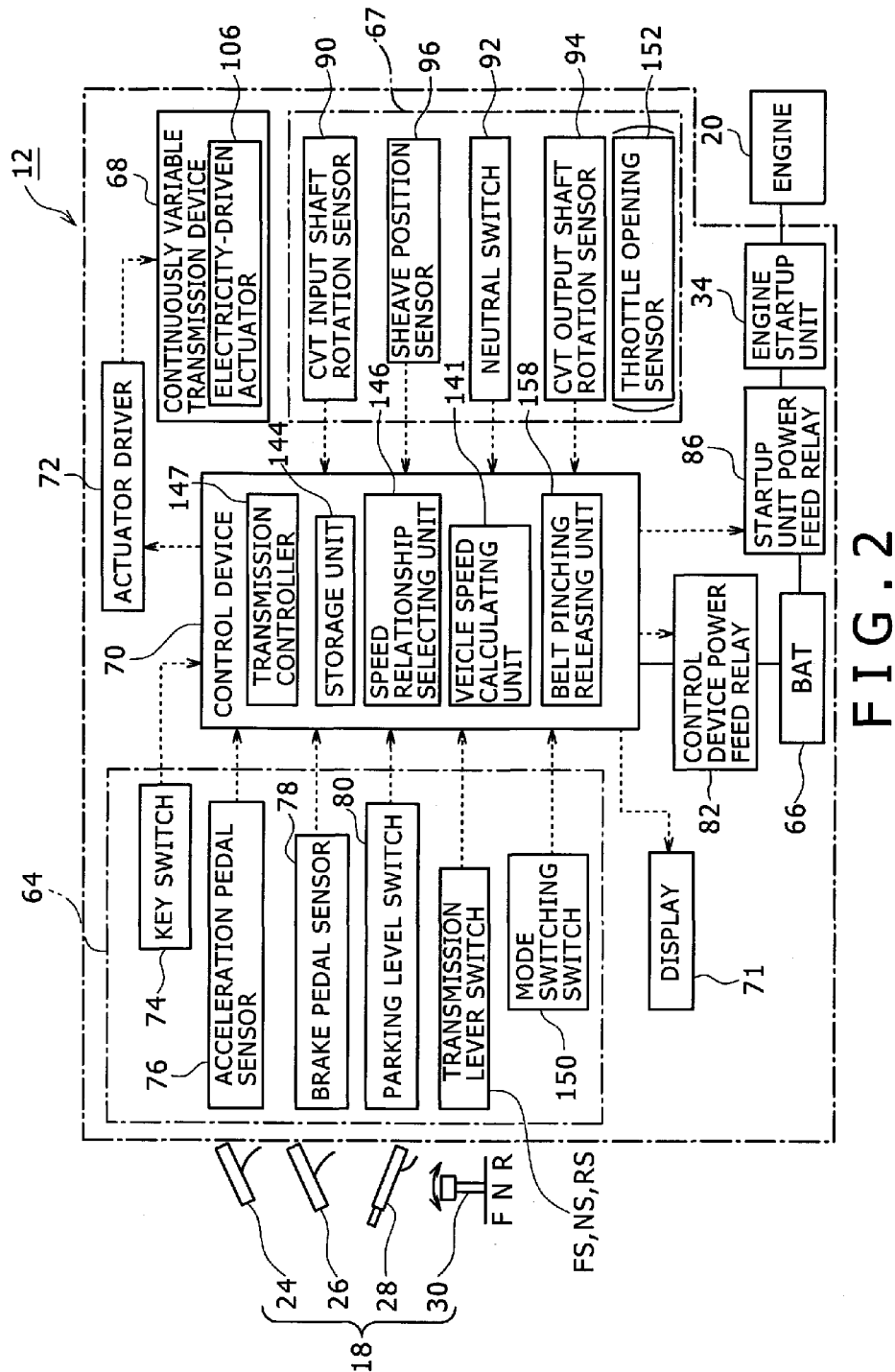
FIG. 2 is a block diagram showing a structure of the continuously variable transmission control system equipped in the vehicle of FIG. 1.

FIG. 2 is a block diagram of a structure of the continuously variable transmission control system 12 equipped in the vehicle 10 of FIG. 1.

The vehicle 10 shown in FIG. 1 comprises a front wheel 14 and a rear wheel 16 which are wheels supported at the front and rear of a vehicle body, a group of operation elements 18 provided in a vehicle interior and shown in FIG. 2, an engine 20, the continuously variable transmission control system 12, and a motive power transmitting mechanism 22. A towing member 17 may be provided on the vehicle 10 when necessary for the work.

The towing member 17 includes an arm 23 provided on a rear part of the vehicle body extending toward the rear direction, and a hitch ball 25 provided on an upper side of the arm 23. The hitch ball 25 is configured to allow engagement of a part 156 to be towed provided on a front side of a trailer 154 in a manner to allow rotation around an axis in an up-and-down direction, to enable towing work to tow the trailer 154 by the vehicle 10. The weight of the trailer 154, which is a large load with respect to the traveling, is applied to the towing member 17 during towing which is the time of work.

The group of operation elements 18 includes an acceleration pedal 24 which is an acceleration command unit and a brake pedal 26 which is a brake operation unit provided on a front side of a driver seat (not shown), a parking brake lever 28 which is a second brake operation unit provided around a center in a left-and-right direction of the vehicle 10 and which can be tilted and displaced in the up-and-down direction, a steering operator (not shown), and a transmission lever 30 which is a transmission command unit shown in FIG. 2.

The brake pedal 26 is connected by a link or a rod to a piston of a master cylinder which supplies hydraulic pressure to a hydraulic brake device provided on one or both of the front wheel 14 and the rear wheel 16, and is configured to activate the brake device as a result of being depressed by the user, which is an operation of the user, and to brake the wheel. The parking brake lever 28 is connected by a link or a wire to a brake maintaining device provided on one or both of the front wheel 14 and the rear wheel 16, and is configured to activate the brake maintaining device by being pulled-up by the user, and to brake or maintain the brake of the wheel. Alternatively, a center brake device which stops rotation of a propeller shaft 32 in connection with the parking brake lever 28 may be provided as the brake maintaining device at a position shown by P on the propeller shaft 32 of FIG. 1, which will be described later. The steering operator is formed with, for example, a steering wheel, and is connected to the front wheel 14 in a manner that allows steering by a steering mechanism of an Ackerman type.

Figure 20:
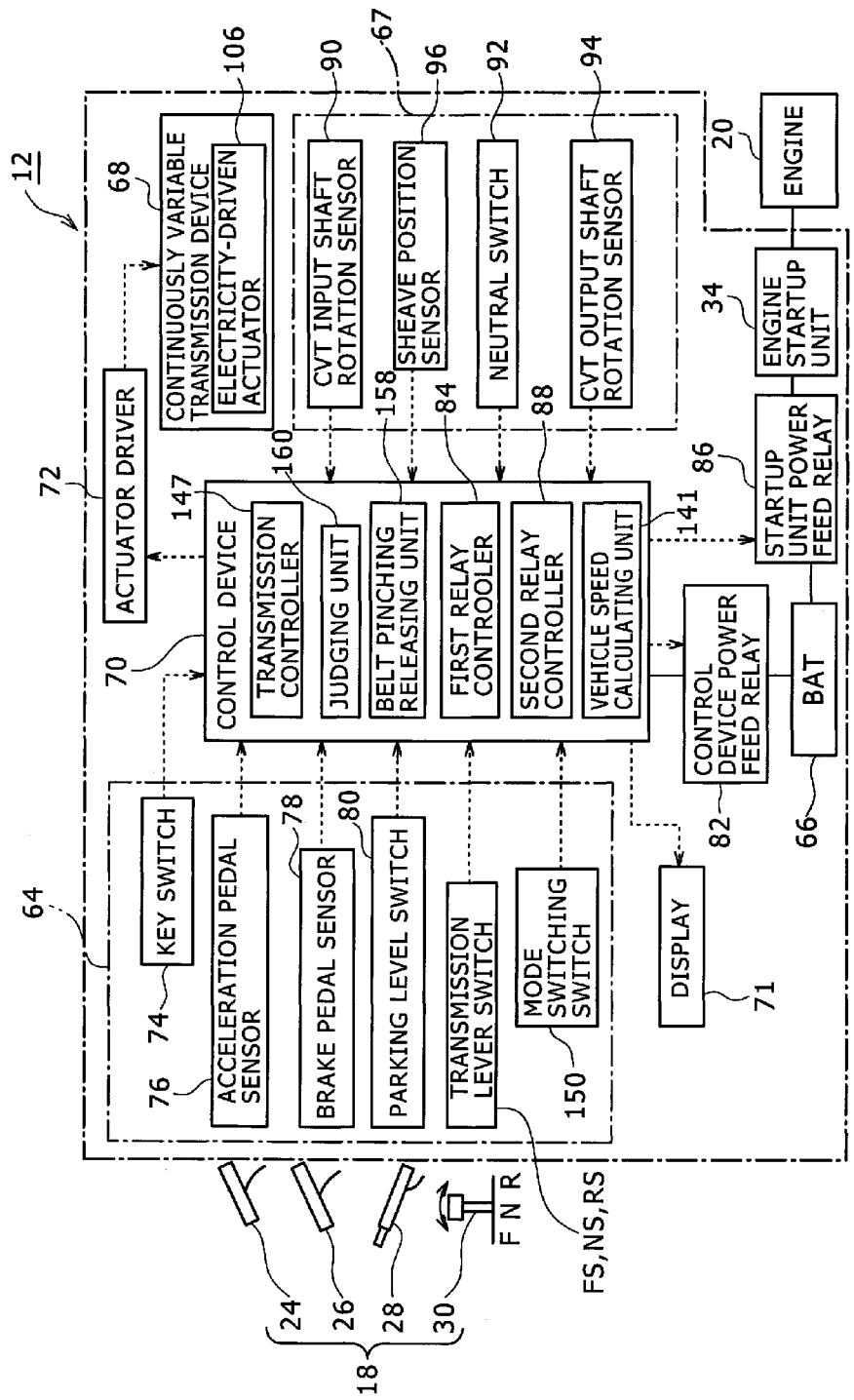
FIG. 20 is a block diagram showing a structure of a continuously variable transmission control system according to a fourth alternative configuration of a preferred embodiment of the present invention and equipped in the vehicle of FIG. 1.

The transmission lever 30 is supported on the vehicle body in a manner that makes it possible to tilt in the front-and-rear direction so that the lever can be switched between an FH position which is a forward travel and high gear position, an FL position which is a forward travel and low gear position, an N position which is a neutral position, and an R position which is a reverse travel position. As shown in FIG. 20 to be described later, as the transmission lever 30, a structure which allows switching between an F position which is a forward travel position, an N position which is a neutral position, and an R position which is a reverse travel position may alternatively be employed.

The engine 20 is used as a motive power source of the front wheel 14 and the rear wheel 16, and is started up by an engine startup unit 34 to be described later. As the engine 20, any of a plurality of types of engines including a gasoline engine and a diesel engine may be employed. Alternatively, a hybrid type structure may be employed having the engine 20, a power generator which is driven by the engine 20 and generates electric power, and a motor which is driven by supplying the electric power generated by the power generator directly or through a battery. An amount of intake air of the engine 20 is adjusted by a degree of opening of a throttle valve, and as the degree of opening of the throttle valve is increased, the amount of fuel mixed with the intake air is increased and the rotational speed of the engine 20 is increased. The degree of opening of the throttle valve is controlled by the engine controller to be described later, and is normally controlled so that the engine 20 is rotated at a constant rotational speed, which results in high engine efficiency and which is set in advance. A detected signal of a pedal position of the acceleration pedal 24 is transmitted to a control device 70 to be described later. The control device 70 controls to reduce a reduction ratio of a continuously variable transmission device 68, to be described later, from a maximum reduction ratio toward a minimum reduction ratio, according to an increase in an amount of depression of the acceleration pedal 24 indicated by the pedal position.

The continuously variable transmission control system 12 outputs the motive power of a CVT input shaft 36 connected to an output shaft 21 of the engine 20, to a CVT output shaft 38 while changing rotational speed of the motive power, and is provided on a motive power transmitting path between the engine 20 and the front wheel 14 and the rear wheel 16, on a side of the engine 20. A detailed structure of the continuously variable transmission control system 12 will be described later.

The motive power transmitting mechanism 22 is provided on the motive power transmitting path on the side of the front wheel 14 and the rear wheel 16, receives an input of the motive power of the CVT output shaft 38 of the continuously variable transmission control system 12, and outputs the motive power to each of left and right front axles 40 and 42 connected to the front wheel 14, and the left and right rear axles 44 and 46 connected to the rear wheel 16. The motive power transmitting mechanism 22 includes a transmission gear device 48 which is an auxiliary transmission device, rear axles 44 and 46, a first motive power converting mechanism 50, the propeller shaft 32, a second motive power converting mechanism 52, a front-side differential gear device 54, and the front axles 40 and 42.

The transmission gear device 48 comprises a group of drive gears 56 placed around a first transmission shaft 49 in a case 55, a second transmission shaft 58 supported on the case 55 parallel with the first transmission shaft 49 and in a rotatable manner, a group of driven gears 60 placed around the second transmission shaft 58 in the case 55, and a rear-side differential gear device 62. The first transmission shaft 49 is fixed concentrically on the CVT output shaft 38. The group of drive gears 56 includes a drive-side high-speed gear, a drive-side low-speed gear, and a drive-side reverse travel gear fixed on the first transmission shaft 49. The group of driven gears 60 includes a driven-side high-speed gear, a driven-side low-speed gear, and a driven-side reverse travel gear which are placed relatively rotatable around the second transmission shaft 58. Each of the drive-side high-speed gear, the drive-side low-speed gear, the driven-side high-speed gear, and the driven-side low-speed gear is a transmission gear.

The driven-side low-speed gear is engaged with the drive-side low-speed gear, and the driven-side high-speed gear is engaged with the drive-side high-speed gear. The driven-side reverse travel gear is engaged with the drive-side reverse travel gear through an intermediate gear fixed on a reverse travel gear shaft (not shown). In this case, a clutch slider (not shown) is placed around the second transmission shaft 58 and between the driven-side forward travel gear and the driven-side reverse travel gear. The clutch slider is spline-engaged so as to not be relatively rotatable and to be slidable in the axial direction, on the second transmission shaft 58 or a spline hub fixed on the second transmission shaft 58. The clutch slider is connected to the transmission lever 30 through a clutch fork and a link mechanism (not shown).

When the clutch slider is moved in the axial direction due to an operation of the transmission lever 30, the clutch slider engages the driven-side forward travel gear or the driven-side reverse travel gear, and the driven-side forward travel gear or the driven-side reverse travel gear is fixed on the second transmission shaft 58.

In addition, a second clutch slider which is connected to the transmission lever 30 through a clutch fork and a link mechanism (not shown) is placed around the second transmission shaft 58 and between the driven-side low-speed gear and the driven-side high-speed gear. The second clutch slider is spline-engaged so as to be not relatively rotatable and to be slidable in the axial direction on the second transmission shaft 58 or a spline hub fixed on the second transmission shaft 58.

The rear-side differential gear device 62 has an output gear which is engaged with an intermediate output gear fixed on the second transmission shaft 58 and a differential gear, transmits the rotation of the output gear to the left and right rear axles 44 and 46, and changes the rotations of the left and right rear axles 44 and 46 according to turning of the vehicle 10.

The first motive power converting mechanism 50 includes a plurality of gears, converts the rotation of the second transmission shaft 58 protruding from the case 55 into a rotational direction around an axis of the vehicle 10 along the front-and-rear direction, and transmits the converted rotation to the propeller shaft 32. The propeller shaft 32 passes on a lower side of an engine 20, and is connected to the second motive power converting mechanism 52. The second motive power converting mechanism 52 includes a plurality of gears, converts the rotation of the propeller shaft 32 into a rotational direction around an axis of the vehicle 10 along the left-and-right direction, and transmits the converted rotation to the front axle 40 and the input shaft of the front-side differential gear device 54. The front-side differential gear device 54 changes the rotation of the input shaft and the front axle 42 according to the turning of the vehicle. Alternatively, the front-side differential gear device 54 may be provided between the second motive power converting mechanism 52 and the front axle 42. In addition, the rotation of the output shaft of the second motive power converting mechanism 52 may be input to the front-side differential gear device 54, and the left and right front axles 40 and 42 may be connected as the output shaft to the front-side differential gear device 54.

With such a structure, the drive-side low-speed gear and the driven-side low-speed gear, which are lower stage gears, and the drive-side high-speed gear and the driven-side high-speed gear, which are higher stage gears, are selectively connected between a driven pulley 98 of the continuously variable transmission device 68, to be described later, and the font wheel 14 and the rear wheel 16. For example, when the FL position, indicating forward travel and low gear, is selected by an operation of the user on the transmission lever 30, the clutch slider engages with the driven-side low-speed gear so that the drive-side low-speed gear and the driven-side low-speed gear are selectively connected between the driven pulley 98 and the front wheel 14 and the rear wheel 16. In this case, the vehicle 10 can be moved forward in a low gear. On the other hand, when the FH position, indicating forward travel and high gear, is selected by the operation of the user on the transmission lever 30, the clutch slider engages the driven-side high-speed gear so that the drive-side high-speed gear and the driven-side high-speed gear are selectively connected between the driven pulley 98 and the front wheel 14 and the rear wheel 16. In this case, the vehicle 10 can be moved forward in a high gear. Further, when the R position is selected, the clutch slider engages the driven-side reverse travel gear so that the vehicle can be moved in a reverse direction. When the N position is selected by displacing the transmission lever 30, the clutch slider is placed between the driven-side low-speed gear and the driven-side reverse travel gear, and a neutral state is achieved in which the clutch slider is not engaged with the driven-side low-speed gear or the driven-side reverse travel gear. In this case, the rotation of the CVT output shaft 38 is not transmitted to any of the front axles 40 and 42 or the rear axles 44 and 46. Because of this, even when the engine 20 is being driven, the vehicle 10 is in an undriven state.

The structure of the transmission gear device 48 is not limited to the above-described structure, and alternatively, various other structures may be employed. For example, in a configuration when only one stage can be selected as the forward travel side in the transmission lever 30, the drive-side high-speed gear and the driven-side high-speed gear may be omitted, and the drive-side low-speed gear and the driven-side low-speed gear may be used for forward travel. The transmission lever 30 is not limited to a structure which is moveable only in the forward-and-backward direction as shown in FIG. 2, and a configuration where the transmission lever 30 can be moved in an H shape or a crank shape may alternatively be employed.

(Overall Structure of Continuously Variable Transmission Control System)

As shown in FIG. 2, the continuously variable transmission control device 12 comprises a group of operation-side sensor switches 64, the battery 66 which is a power supply, the engine startup unit 34, a group of drive-side sensor switches 67, the continuously variable transmission device 68, the control device 70 which is called an ECU (Electronic Control Unit), a display 71, and an actuator driver 72.

The group of operation-side sensor switches 64 includes a key switch 74, an acceleration pedal sensor 76 which is an acceleration command detection unit, a brake pedal switch 78 which is a brake command unit, a parking lever switch 80 which is a second brake command unit, transmission lever switches HS, LS, NS, and RS which are lever position detection units, and a mode switching switch 150 which is a switch command unit.

The key switch 74 is switched between ON and OFF by a manual operation to turn a key while the key is inserted by the user, and outputs a signal indicating the ON/OFF state to the control device 70. As the startup and stop command unit, in place of the key switch 74, a switch which can be switched ON and OFF without the need of the key, or a press button which is switched between ON and OFF every time the button is pressed, may alternatively be employed.

The acceleration pedal sensor 76 detects a pedal position which is an acceleration operation position of the acceleration pedal 24, which is one drive state of the vehicle. The brake pedal switch 78 is switched ON when the brake pedal 26 is operated by the user, that is, when the brake pedal 26 is depressed. The brake pedal switch 78 is switched OFF when the brake pedal 26 is in the non-operation state, that is, when the brake pedal 26 is not depressed. In place of or in addition to the brake pedal switch 78, a sensor which measures an amount of depression of the brake pedal 26 may be employed, whether or not the brake pedal 26 is operated may be detected by the sensor, and the width between the moveable sheave and the fixed sheave of the continuously variable transmission device 68, to be described later, may be controlled based on a signal indicating the detection result.

The parking lever switch 80 is switched ON when the parking brake lever 28 is operated to the upper side, and is switched OFF when the parking brake lever 28 is returned to the lower side. The transmission lever switches HS, LS, NS, and RS include a plurality of switches provided corresponding to the FH, FL, N, and R positions of the plurality of operation positions of the transmission lever 30, respectively. Each of the transmission lever switches HS, LS, NS, and RS is switched ON when the transmission lever 30 is operated to the corresponding operation position, and is switched OFF when the transmission lever 30 is operated to a different position, so that the operation position of the transmission lever 30 is detected.

Figure 3:
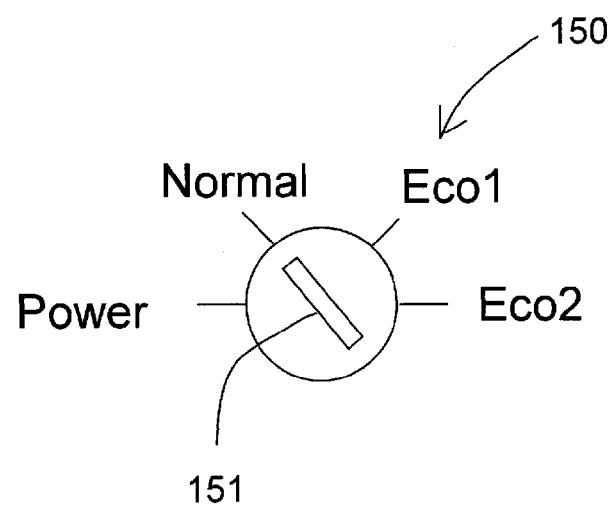
FIG. 3 is a diagram showing an example of a mode switching switch of FIG. 2.

As shown in FIG. 3, the mode switching switch 150 is provided at a periphery of the driver seat to be operable by the user, and is configured to allow selecting and commanding of one of four transmission modes including a power mode, a normal mode, a first economy mode, and a second economy mode, by the user selectively operating an operation unit 151 with turning the unit 151. The four transmission modes indicate four types of speed relationships, which are relationships of rotational speeds between the drive pulley 102 and the driven pulley 98 of the continuously variable transmission device 68 shown in FIG. 4, to be described later. In FIG. 3, the "Power", "Normal", "Eco1", and "Eco2" correspond to the power mode, the normal mode, the first economy mode, and the second economy mode, respectively. The power mode is a mode prioritizing traveling at a high torque, the normal mode is a standard setting mode constituting a standard, the first economy mode is a mode prioritizing traveling with a high fuel consumption performance, and the second economy mode is a mode prioritizing traveling with an even higher fuel consumption performance than the first economy mode. The mode switching switch 150 is not limited to switching among 4 types of modes, and may be any switch that allows switching among two or more types of modes.

Referring back to FIG. 2, the acceleration pedal sensor 76 transmits a signal indicating a detected pedal position to the control device 70. Each of the key switch 74 and the transmission lever switches HS, LS, NS, and RS transmits a signal indicating respective ON/OFF state to the control device 70. When the brake pedal switch 78 indicates that the brake pedal 26 is operated by the user, the brake pedal switch 78 transmits a brake command signal indicating a command of braking of the vehicle to the control device 70. When the parking lever switch 80 indicates that the parking brake lever 28 is operated by the user, the parking lever switch 80 transmits a brake command signal indicating a command of braking, or maintaining braking, of the vehicle 10 to the control device 70.

The mode switching switch 150 indicates that the operation unit 151 is operated by the user, and transmits a switch command signal to the control device 70. The switch command signal indicates a command for switching among a plurality of speed relationships, each of which is a relationship between an input shaft rotational speed N1 of the drive pulley 102 and an output shaft rotational speed V2 of the driven pulley 98 of the continuously variable transmission device 68.

In the following, an operation on the acceleration pedal 24 will be referred to as acceleration ON and the setting of the acceleration pedal 24 in the non-operation state will be referred to as acceleration OFF. Similarly, the operation of the brake pedal 26 or the parking brake lever 28 will be referred to as brake ON, and the setting of the brake pedal 26 or the parking brake lever 28 to the non-operation state will be referred to as brake OFF.

The battery 66 is connected to the control device 70 through a control device power feed relay 82. As the power supply, in place of the battery 66, a capacitor may alternatively be used. The control device power feed relay 82 is connected between the battery 66 and the control device 70, and is controlled by the control device 70 so that the relay is switched ON by switching ON of the key switch 74 and switched OFF by switching OFF of the key switch 74.

The engine startup unit 34 includes a cell motor, and is driven when electric power is supplied from the battery 66 to the cell motor, to start up the engine 20. The engine startup unit 34 is connected to the battery 66 through a startup unit power feed relay 86. The startup unit power feed relay 86 is connected between the battery 66 and the engine startup unit 34, and is controlled by the control device 70 to be switched ON by the switching ON of the key switch 74 and switched OFF by the switching OFF of the key switch 74.

The group of drive-side sensor switches 67 includes a CVT input shaft rotation sensor 90 which is an input rotation detection unit and an engine rotation sensor, a neutral switch 92, a CVT output shaft rotation sensor 94 which is an output rotation detection unit, and a sheave position sensor 96 to be described later. The CVT input shaft rotation sensor 90 detects a rotational speed of an output shaft 21 of the engine 20 which rotates integrally with the CVT input shaft 36 as the CVT input shaft rotational speed N1, and transmits a signal indicating the rotational speed N1 to the control device 70. The neutral switch 92, when a neutral state is set by the transmission gear device 48, detects the establishment of the neutral state, and transmits the signal indicating the establishment to the control device 70. The CVT output shaft rotation sensor 94 detects a rotational speed of the CVT output shaft 38 which is an output shaft of the driven pulley 98 shown in FIG. 1, and transmits a signal indicating a detected value of the rotational speed to the control device 70. The driven pulley 98 shown in FIG. 1 is provided at the periphery of the CVT output shaft 38. The "rotational speed" also includes a meaning of a number of rotations or rotational speed which is a rotational speed per unit time, for example, per minute.

(Structure of Continuously Variable Transmission Device)

Figure 4:
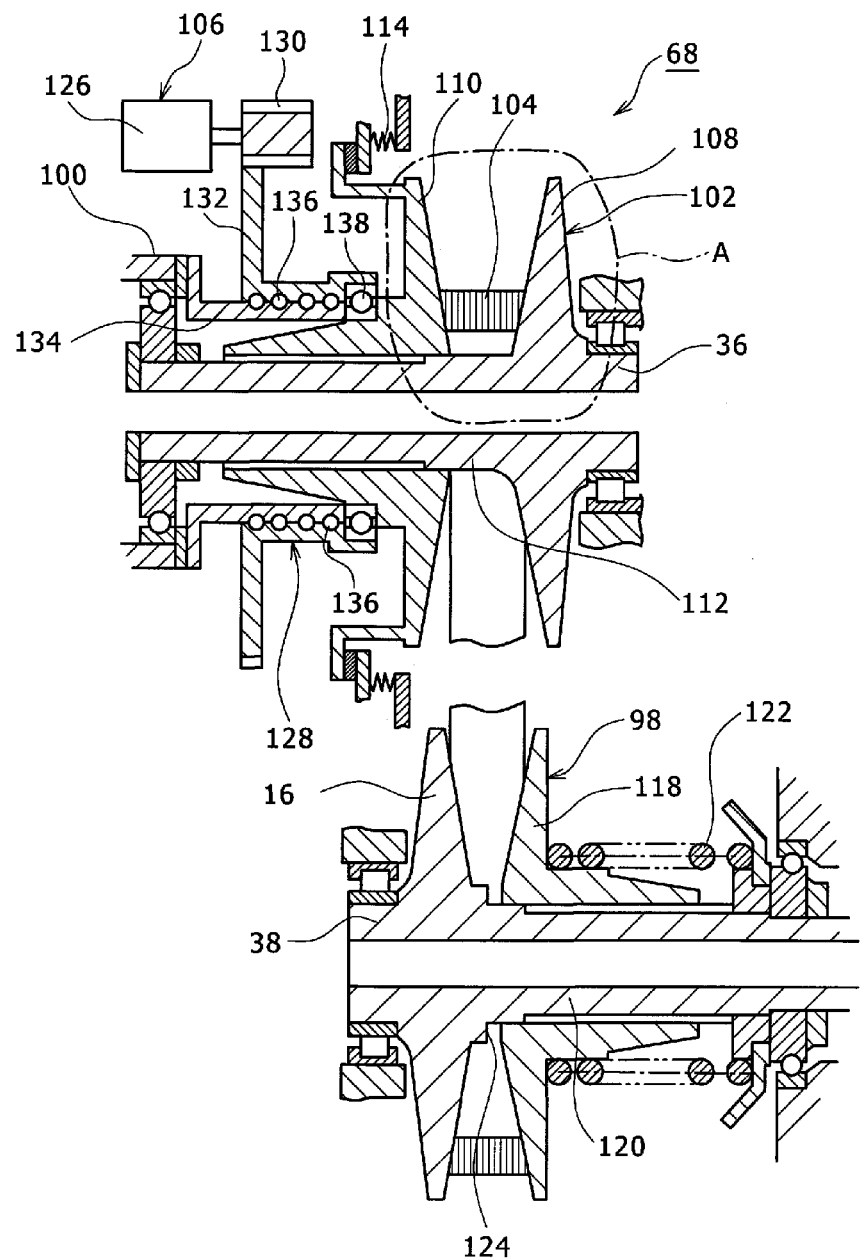
FIG. 4 is a cross sectional diagram showing a case where a normal maximum reduction ratio is realized in the continuously variable transmission device in the continuously variable transmission control system of FIG. 1.

FIG. 4 is a cross sectional diagram showing a case where a normal maximum reduction ratio is realized in the continuously variable transmission device 68. The continuously variable transmission device 68 includes the CVT input shaft 36 and the CVT output shaft 38 rotatably supported on a gearbox case 100, the drive pulley 102 provided on a radially outer side of the CVT input shaft 36, the driven pulley 98 provided on a radially outer side of the CVT output shaft 38, a metal belt 104 suspended between the drive pulley 102 and the driven pulley 98, and an electricity-driven actuator 106. The continuously variable transmission device 68 is connected between the engine 20 and the front wheel 14 and the rear wheel 16 to allow transmission of motive power.

The CVT input shaft 36 is fixed concentrically with the output shaft 21 of the engine 20. The CVT output shaft 38 is placed parallel to the CVT input shaft 36. The drive pulley 102 includes a first fixed sheave 108 and a first moveable sheave 110 provided in the gearbox case 100. The first fixed sheave 108 is integrally formed with an outer circumferential surface on one end of the CVT input shaft 36 to protrude in the radial direction. The first moveable sheave 110 is placed at the periphery of a shaft portion 112 of the CVT input shaft 36 to be moveable in the axial direction with respect to the first fixed sheave 108 and to be not relatively rotatable. A spring 114 is attached between the first moveable sheave 110 and the gearbox case 100 so that the first moveable sheave 110 is urged in a direction away from the first fixed sheave 108 in relation to the axial direction. The sheave position sensor 96 shown in FIGs. 1 and 2 detects an axial position of the first moveable sheave 110, and transmits a signal indicating the axial position to the control device 70. Alternatively, the output shaft 21 of the engine 20 and the CVT input shaft 36 may be connected through a torque converter. In this case, the CVT input shaft rotation sensor 90 is provided to detect the rotational speed of the CVT input shaft 36.

The drivendriven pulley 98 includes a second fixed sheave 116 and a second moveable sheave 118 provided in the gearbox case 100. The second fixed sheave 116 is integrally formed on an outer circumferential surface on one end of the CVT output shaft 38 to protrude in the radial direction. The second moveable sheave 118 is placed at the periphery of the shaft portion 120 of the CVT output shaft 38 in a manner to be moveable in the axial direction with respect to the second fixed sheave 116 and not relatively rotatable. The second moveable sheave 118 is urged by a spring 122 provided between the second moveable sheave 118 and the gearbox case 100 in a direction toward the second fixed sheave 116 in relation to the axial direction. With this structure, a tension is applied from the drive pulley 102 and the driven pulley 98 to the belt 104, and the tension is maintained constant. The CVT output shaft 38 has on its outer circumferential surface a step surface 124 which is a movement restriction unit provided at a root portion of the second fixed sheave 116. The step surface 124 is positioned on a plane orthogonal to the axial direction of the CVT output shaft 38, and restricts the movement in the axial direction by one end of the second moveable sheave 118 hitting the step surface 124 when the second moveable sheave 118 moves toward the second fixed sheave 116. The movement restriction unit is not limited to such a structure, and any structure which is formed on the CVT output shaft 38 or a member fixed on the CVT output shaft 38 and which restricts movement of the second moveable sheave 118 toward the second fixed sheave 116 may be employed.

The electricity-driven actuator 106 has an electric motor 126 which can be rotated in both directions, and a ball screw mechanism 128 which moves the first moveable sheave 110 in the axial direction in response to the rotation of the electric motor 126. The ball screw mechanism 128 includes a small gear 130 fixed on the rotational shaft of the electric motor 126, an outer screw member 132 having, on an outer circumferential surface, a gear portion that engages the small gear 130, an inner screw member 134 placed on a radially inner side of the outer screw member 132, and a plurality of balls 136 placed between the inner screw member 134 and the outer screw member 132. The inner screw member 134 is fixed on the gearbox case 100. The plurality of balls 136 is placed between a helical groove on an inner circumferential surface of the outer screw member 132 and a helical groove on an outer circumferential surface of the inner screw member 134. A bearing 138 is placed between the outer screw member 132 and the first moveable sheave 110. The electric motor 126 is controlled by the control device 70, to be described later.

When the outer screw member 132 engaged with the small gear 130 moves to the left side in FIG. 4 while being rotated in one direction by rotation of the electric motor 126 in one direction, the first moveable sheave 110 is also moved to the left side of FIG. 4 by the spring 114, and an width between the first fixed sheave 108 and the first moveable sheave 110 is increased. In this case, the winding length of the belt 104 at the drive pulley 102 is reduced, and the second moveable sheave 118 is moved to the left side of FIG. 4 toward the second fixed sheave 116 by the urging force of the spring 122. Because of this, the winding position of the belt 104 with respect to the drive pulley 102 is moved toward the radially inner side, and the winding position of the belt 104 with respect to the driven pulley 98 is moved toward the radially outer side. In this case, the rotation of the drive pulley 102 is transmitted to the driven pulley 98 while reducing the rotational speed of the rotation.

Figure 5:
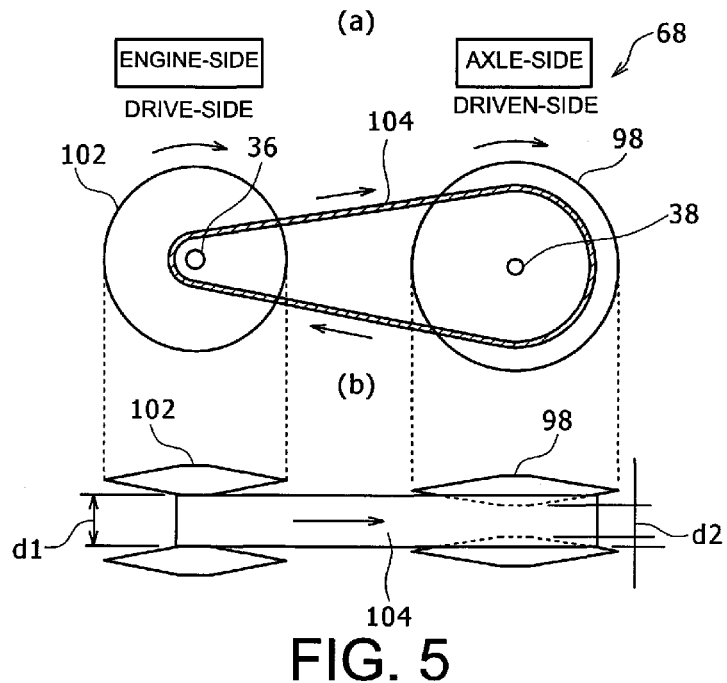
FIG. 5 shows a schematic cross sectional view (a) showing a winding state of a belt between two pulleys when the normal maximum reduction ratio is realized in the continuously variable transmission device of FIG. 4, and a view (b) of (a) viewed from above.

FIGS. 5(a) and 5(b) show winding positions of the belt 104 on the drive pulley 102 and the driven pulley 98 when a normal maximum reduction ratio is realized. The "normal maximum reduction ratio" is a maximum reduction ratio when the motive power is transmitted between the pulleys 102 and 98 without slipping of the belt 104. On the other hand, when the width between the moveable sheave and the fixed sheave in the drive pulley 102 is widened from the normal maximum reduction ratio state, as will be described later, the reduction ratio may be increased. In this case, the belt slips with respect to the pulleys 102 and 98, and almost no motive power is transmitted between the pulleys 102 and 98. In FIG. 5, the width between the moveable sheave and the fixed sheave d1 of the drive pulley 102 is increased and the width between the moveable sheave and the fixed sheave d2 of the driven pulley 98 is reduced. In this case, the reduction ratio N1/N2 of the continuously variable transmission device 68, which is a ratio of the rotational speed N1 of the CVT input shaft 36 with respect to the rotational speed N2 of the CVT output shaft 38, is at maximum, and thus, the rotation of the engine 20 is transmitted to the CVT output shaft 38 while reducing the rotational speed of the rotation in a maximum degree.

On the other hand, in FIG. 4, when the outer screw member 132 moves to the right side of FIG. 4 while being rotated by the rotation of the electric motor 126 in the other direction, the outer screw member 132 presses the first moveable sheave 110 toward the side of the belt 104 through the bearing 138, and the width between the moveable sheave and the fixed sheave is reduced. In this case, the winding length of the belt 104 at the drive pulley 102 is increased, and the second moveable sheave 118 is moved to the right side of FIG. 4 away from the second fixed sheave 116, against the urging force of the spring 122. Because of this, the winding position of the belt 104 with respect to the drive pulley 102 is moved toward the radially outer side, and the winding position of the belt 104 with respect to the driven pulley 98 is moved toward the radially inner side. In this case, the rotation of the drive pulley 102 is transmitted to the driven pulley 98, while increasing the rotational speed of the rotation, that is, the reduction ratio becomes less than 1.

Figure 6:
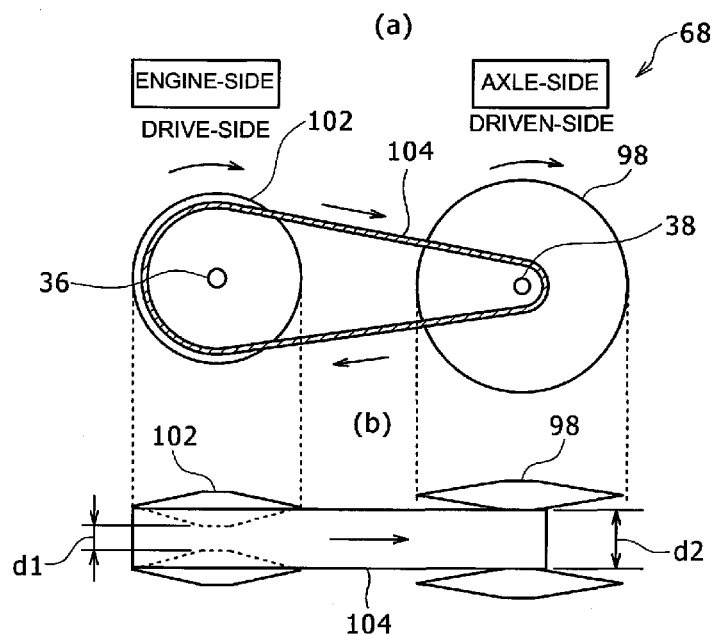
FIG. 6 shows a schematic cross sectional view (a) showing a winding state of a belt between two pulleys when a minimum reduction ratio is realized in the continuously variable transmission device of FIG. 4, and a view (b) of (a) viewed from the above.

FIGs. 6(a) and 6(b) show winding positions of the belt 104 on the drive pulley 102 and the driven pulley 98 when the minimum reduction ratio is realized. In FIG. 6, the width between the moveable sheave and the fixed sheave d1 of the drive pulley 102 is reduced and the width between the moveable sheave and the fixed sheave d2 of the driven pulley 98 is increased. In this case, the reduction ratio N1/N2 of the continuously variable transmission device 68 is minimum, and the rotation of the engine 20 is transmitted to the CVT output shaft 38 while increasing the rotational speed of the rotation in a maximum degree.

Figure 7:
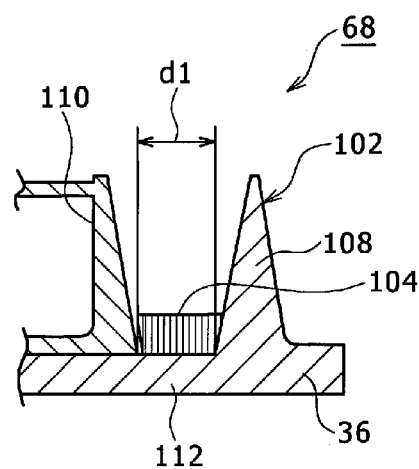
FIG. 7 is a diagram showing a state where pinching of the belt in the drive pulley is released in a section A of FIG. 4.

On the other hand, at the drive pulley 102, after the normal maximum reduction ratio is realized, as shown in FIG. 4, the first moveable sheave 110 is further moved away from the first fixed sheave 108, the width between the moveable sheave and the fixed sheave becomes greater than or equal to a predetermined distance which is set in advance, and a state of FIG. 7 is reached with one end of the first moveable sheave 110 hitting a part of the CVT input shaft 36 or a member fixed on the CVT input shaft 36. In this state, the pinching of the belt 104 between the first moveable sheave 110 and the first fixed sheave 108 at the drive pulley 102 is released, and the inner circumferential surface of the belt 104 contacts the outer circumferential surface of the shaft portion 112 of the CVT input shaft 36. Dimensions of the belt 104 and of the portion on which the belt 104 is suspended are defined such that the tension applied from the CVT input shaft 36 and the driven pulley 98 to the belt 104 in this state becomes 0. In this state, the rotation of the CVT input shaft 36 is not transmitted to the belt 104, and the CVT input shaft 36 spins loosely with respect to the belt 104. In the driven pulley 98 of FIG. 4, the second moveable sheave 118 is moved toward the second fixed sheave 116, which is the movement restriction unit, by the urging force of the spring 122 until one end of the second moveable sheave 118 hits the step surface 124 of the CVT output shaft 38. The "normal maximum reduction ratio" is a maximum reduction ratio when the width between the moveable sheave and the fixed sheave at the drive pulley 102 becomes less than a predetermined distance, and the motive power is transmitted by the belt 104 between the drive pulley 102 and the driven pulley 98 without slipping.

Referring back to FIG. 2, the control device 70 includes a microcomputer having a CPU and a storage unit such as a memory, and also has a vehicle speed calculating unit 141, a belt pinching releasing unit 158, an engine controller (not shown), a storage unit 144, a speed relationship selecting unit 146, and a transmission controller 147.

The vehicle speed calculating unit 141 calculates a vehicle speed based on the output shaft rotational speed N2 of the CVT output shaft 38 detected by the CVT output shaft rotation sensor 94, and the operation position of the transmission lever 30 detected by the transmission lever switches HS, LS, NS, and RS. When the brake command signal is input from the brake pedal switch 78 or the parking lever switch 80, that is, when brake is ON, the belt pinching releasing unit 158 increases the width between the moveable sheave and the fixed sheave of the drive pulley 102 to a width greater than or equal to a predetermined width which is set in advance, as shown in FIG. 7, to release the pinching of the belt 104 by the fixed sheave 108 and the moveable sheave 110. In the brake OFF state, the control device 70 causes the first moveable sheave 110 to move toward the first fixed sheave 108, to realize a pinching state of the belt 104. Because of this, in the brake ON state, the motive power transmission at the continuously variable transmission device 68 is blocked.

Figure 8:
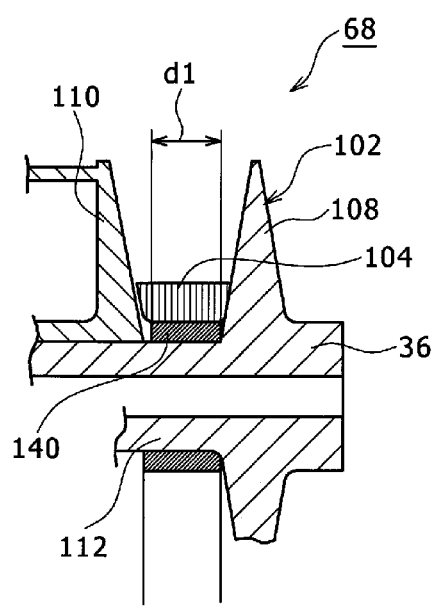
FIG. 8 is a diagram corresponding to FIG. 7 and showing an alternative configuration of the continuously variable transmission device.

As shown in the alternative configuration of FIG. 8, a structure may be employed in which a cylindrical sleeve 140 made of a resin or the like is placed between the outer circumferential surface of the shaft portion 112 of the CVT input shaft 36 and the belt 104, and the loose spinning of the CVT input shaft 36 with respect to the belt 104 is further facilitated when the pinching of the belt 104 at the drive pulley 102 is released.

Figure 9:
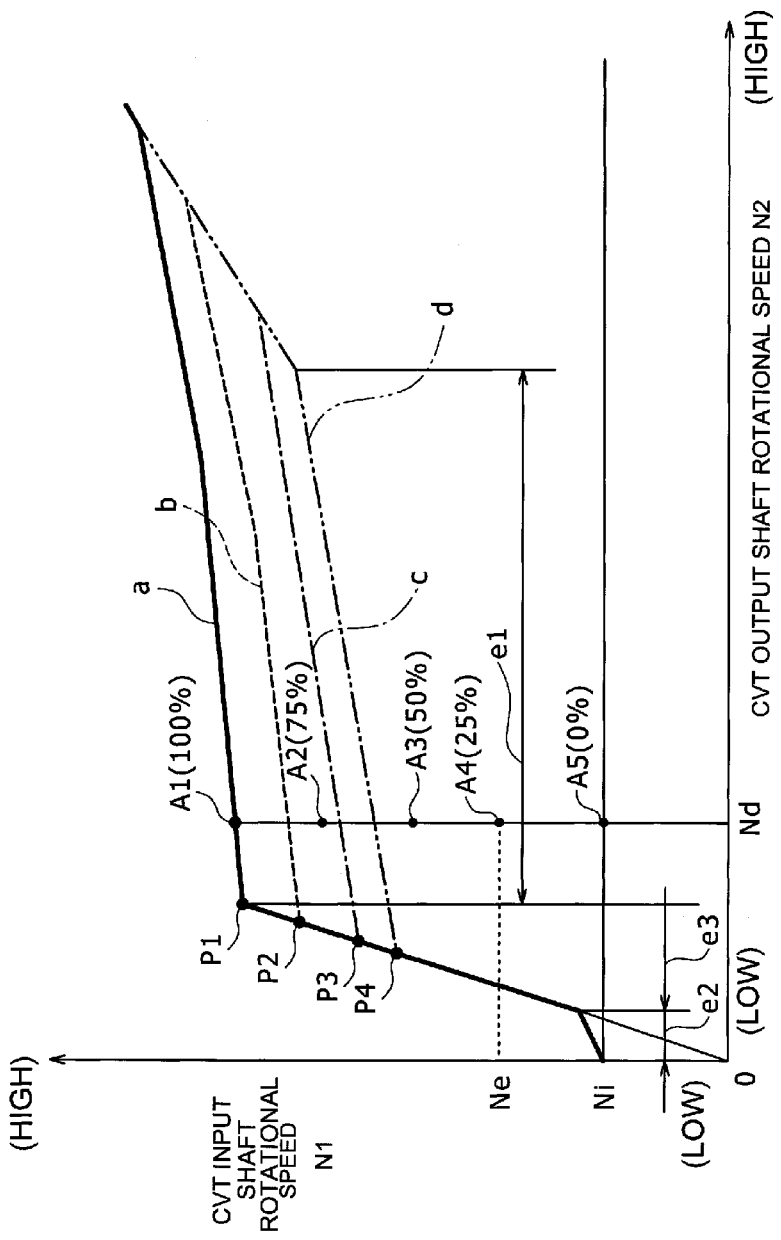
FIG. 9 is a diagram showing a map showing a plurality of speed relationships for the rotational speeds of the drive pulley and the driven pulley, stored in the control device of FIG. 2.

The storage unit 144 stores as a plurality of maps a plurality of speed relationships corresponding to the plurality of transmission modes which can be selected by the mode switching switch 150. FIG. 9 shows, together in one map, a plurality of speed relationships stored in the storage unit 144, each of which being a relationship between the CVT input shaft rotational speed N1 and the CVT output shaft rotational speed N2. In FIG. 9, a wide solid line a shows the power mode, a broken line b shows the normal mode, a dot-and-chain line c shows the first economy mode, and a two-dots-and-chain line d shows the second economy mode. The map of FIG. 9 shows a case in each transmission mode where a degree of opening of the acceleration is 100%, which is a fully opened state for the degree of opening of the throttle valve corresponding to a case where the acceleration pedal 24 is completely depresses, and in the case of an intermediate degree of opening which is not an acceleration opening of 100%, the speed relationship is set corresponding to the percentage of the degree of opening of the acceleration. For example, when the CVT output shaft rotational speed N2 is Nd in the power mode shown by the wide solid line a in FIG. 9, the CVT input shaft rotational speeds N1 at points A1, A2, A3, A4, and A5 are set corresponding to the degree of opening of the acceleration of 100%, 75%, 50%, 25%, and 0%. In any of the lines showing any of the modes in FIG. 9, the output shaft rotational speed N2 is increased as the input shaft rotational speed N1 is increased. On the other hand, in at least a region e1 which is set in advance of the output shaft rotational speed N2, for the same output shaft rotational speed N2, the input shaft rotational speed N1 becomes greater in the order of the power mode, normal mode, first economy mode, and second economy mode.

In FIG. 9, Ni shows an idle rotational speed of the engine 20 when the transmission gear device 48 is in the neutral state and the pinching of the belt 104 is released at the drive pulley 102. In a region e2 of the CVT output shaft rotational speed N2, a speed relationship in a state where the belt 104 slips at the drive pulley 102 is shown, and a region e3 shows a case of the normal maximum reduction ratio state where the reduction ratio N1/N2 is maximum.

In the region e3 in each mode of FIG. 9, the reduction ratio is at the normal maximum reduction ratio and is constant, but the transmission starting point where the reduction ratio is changed differs depending on the mode. For example, in the case of the degree of opening of acceleration of 100%, in the power mode, the point P1 becomes a transmission starting point where the transmission starts to reduce the reduction ratio at a high-speed side compared to the point P1, and in the normal mode, first economy mode, and second economy mode, the points P2, P3, and P4 become the transmission starting points, respectively.

Figure 10:
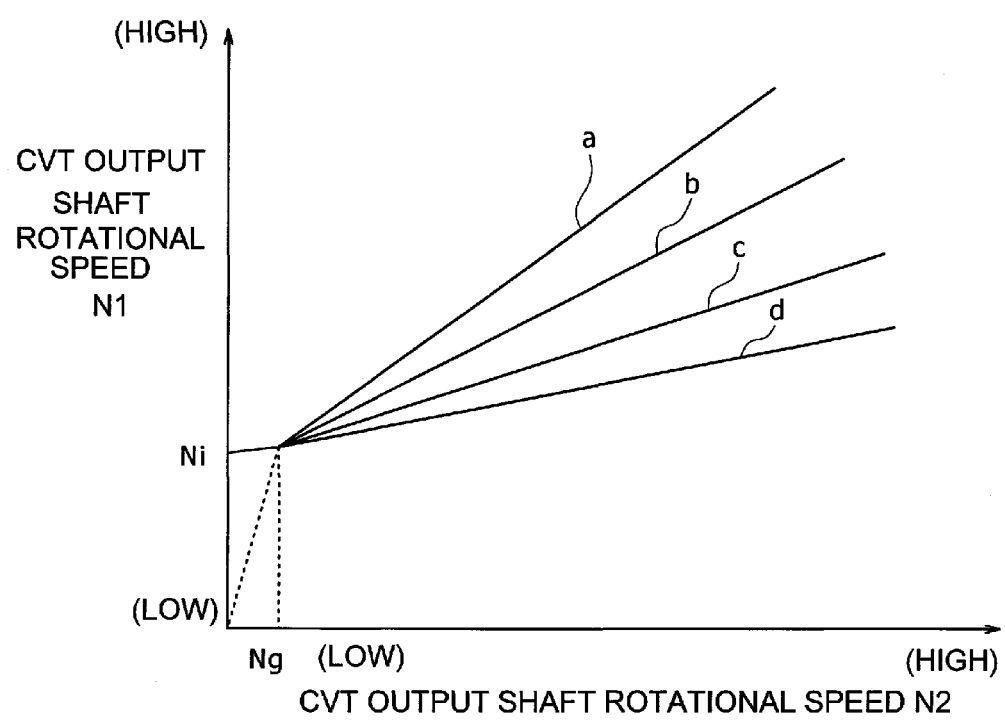
FIG. 10 is a diagram showing an alternative example map showing a plurality of speed relationships for the rotational speeds of the drive pulley and the driven pulley, stored in the control device of FIG. 2.

The relationship indicating the plurality of transmission modes is not limited to the map of FIG. 9, and various maps may be employed. For example, as shown in FIG. 10, a plurality of maps may be set such that the maximum reduction ratio is realized when the CVT output shaft rotational speed N2 is Ng, and in all regions in which each transmission mode is set at a rotational speed greater than or equal to Ng, the slope which is a ratio of the increase of N1 with respect to the increase of N2 differs among the power mode a, the normal mode b, the first economy mode c, and the second economy mode d. In this case, at the output shaft rotational speed N2 of greater than or equal to Ng, the input shaft rotational speed N1 becomes higher in the order of the power mode a, normal mode b, first economy mode c, and second economy mode d with respect to the same output shaft rotational speed N2.

Moreover, an arbitrary number of maps may be set according to a change of the number of modes which can be selected with the mode switching switch 150. For example, two, three, or five or more arbitrary modes may be set to be selectable as the transmission mode.

The speed relationship selecting unit 146 selects one map from the maps of the plurality of transmission modes stored in the storage unit 144 according to an input of the switch command signal by the mode switching switch 150. For example, when the power mode is commanded by the mode switching switch 150 of FIG. 3, the speed relationship selecting unit 146 selects the speed relationship of the power mode shown with the wide solid line a in FIG. 9 at the degree of opening of the acceleration of 100%.

The transmission controller 147 controls the reduction ratio of the continuously variable transmission device 68 based on the selected one map, the detected CVT input shaft rotational speed N1 and the CVT output shaft rotational speed N2, and the degree of opening of the acceleration indicated by the detected pedal position of the acceleration pedal sensor 76, so that the CVT output shaft rotational speed N2 corresponding to the degree of opening of acceleration and the CVT input shaft rotational speed N1 in the selected map is obtained. In this case, the transmission controller 147 controls the driving of the electric motor 126 of the electricity-driven actuator 106 through the actuator driver 72, to move the first moveable sheave 110. The actuator driver 72 has an inverter, generates a drive current of the electric motor 126 according to a control signal from the control device 70, and drives the electric motor 126. For example, when the map of the power mode of the wide solid line a of FIG. 9 is selected, the detected CVT input shaft rotational speed N1 is Ne, and the degree of opening of acceleration is 25%, the transmission controller 147 controls the continuously variable transmission device 68 such that the reduction ratio is Ne/Nd. In this case, the width between the moveable sheave and the fixed sheave is changed by the driving of the electricity-driven actuator 106 according to the detected values of the CVT input shaft rotational speed N1 and CVT output shaft rotational speed N2. In this case, the transmission controller 147 changes the width between the moveable sheave and the fixed sheave such that the relationship between the CVT input shaft rotational speed N1 and the detected value N2 of the CVT output shaft rotational speed reaches or coincides with the selected map. The engine 20 is controlled to maintain rotation at a constant rotational speed which is efficient during driving.

Alternatively, a configuration may be employed for the control device 70 in which, even when the key switch 74 is switched from the ON state to the OFF state, unless the switching to the N position is detected by the detection signals from the transmission lever switches HS, LS, NS, and RS and establishment of the neutral state is detected by the detection signal from the neutral switch 92, the control device power feed relay 82 is not switched OFF. Alternatively, a configuration may be employed for the control device 70 in which, even when the key switch 74 is switched from the OFF state to the ON state, unless the switching to the N position is detected by the detection signals from the transmission lever switches HS, LS, NS, and RS and the establishment of the neutral state is detected by the detection signal from the neutral switch 92, the startup unit power feed relay 86 is not switched ON.

The display 71 is provided at the periphery of the driver seat, and has a liquid crystal display unit or a plurality of lighting units indicating the operation position of the transmission lever 30. The control device 70 displays or lights on the display 71 to notify the user of the operation position of the transmission lever 30 according to the inputs of the detection signals of the transmission lever switches HS, LS, NS, and RS, or to notify of an abnormality location at the time when abnormality occurs.

(Operation and Advantage of Continuously Variable Transmission Control System)

Figure 11:
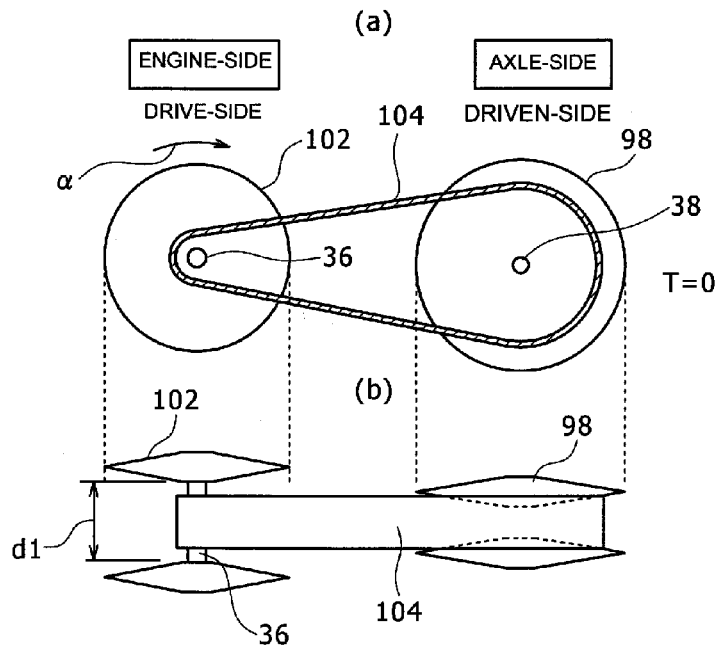
FIG. 11 shows a schematic cross sectional view (a) showing an example of a state where pinching of the belt is released between the sheaves of the drive pulley in the continuously variable transmission device of FIG. 4, and a view (b) of (a) viewed from above.

According to the continuously variable transmission control system 12 described above, when the brake command signal is input from the brake pedal switch 78 or the parking lever switch 80 to the control device 70, the pinching of the belt 104 by the first moveable sheave 110 and the first fixed sheave 108 is released. FIG. 11(a) is a schematic cross sectional diagram showing a state where the pinching of the belt 104 between the sheaves of the drive pulley 102 is released in the continuously variable transmission device 68 of FIG. 4, and FIG. 11(b) is a view of FIG. 11(a) viewed from above. In the state where the pinching of the belt 104 is released, even when the CVT input shaft 36 and the drive pulley 102 rotate in the direction of the arrow α in FIG. 11 (a) as a result of the driving of the engine 20, the tension T applied from the CVT input shaft 36 and the driven pulley 98 on the belt 104 is 0, and the belt is in a sagged state, and thus the motive power of the CVT input shaft 36 is not transmitted to the belt 104. Because of this, even when there is a deviation between the reduction of the rotational speed of the engine 20 and the reduction of the rotational speed of the wheel in a case where the vehicle decelerates with the brake ON, friction between the CVT input shaft 36 and the drive pulley 102 and the belt 104 can be reduced.

Figure 12:
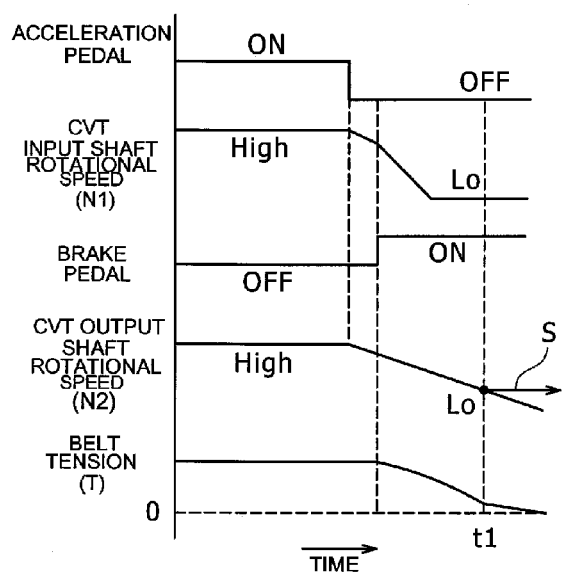
FIG. 12 is a diagram showing example changes, with respect to time, of rotational speeds of a CVT input shaft and a CVT output shaft, and a belt tension in a case where a brake pedal is operated while an acceleration pedal is in a non-operation state during travel in a preferred embodiment of the present invention.

FIG. 12 shows an example of changes with respect to time of the rotational speeds N1 and N2 of the CVT input shaft 36 and the CVT output shaft 38, and the belt tension T in the case where acceleration is OFF and the brake is ON during traveling. During traveling in which the CVT input shaft 36 and the CVT output shaft 38 are rotated with acceleration ON, when the acceleration is set to OFF and the brake is set to ON, the CVT input shaft 36 is quickly decelerated with the reduction of the rotational speed of the engine 20. However, the reduction of the rotation of the wheel which is linked with the CVT output shaft 38 may be gradual due to the influence of an amount of operation of the brake pedal 26, causing a difference in the rotational speed between the CVT input shaft 36 and the CVT output shaft 38 as shown in FIG. 12. In this case also, the tension of the belt 104 becomes approximately 0 after time t1 with the brake OFF, and thus, even if there is a difference between the rotational speeds N1 and N2 in a speed region S after t1, the wearing of the belt 104 during braking can be reduced. In addition, because it is not necessary to provide the centrifugal clutch, the number of components and the cost of manufacturing can be reduced.

In addition, according to the continuously variable transmission control system 12 described above, in the control device 70, a map which indicates a speed relationship is selected according to an input of the switch command signal indicating a command for switching of the speed relationship, and the width between the moveable sheave and the fixed sheave is changed by driving of the electricity-driven actuator 106 based on the selected map and the detected values of the input shaft rotational speed N1 of the drive pulley 102 and the output shaft rotational speed N2 of the driven pulley 98. Because of this, the relationship of the rotational speeds of the drive pulley 102 and the driven pulley 98 can be switched among a plurality of types of relationships without the need for a switching mechanism with a plurality of torque cam mechanisms. For example, when the power mode (a in FIG. 9) is commanded by the mode switching switch 150, in FIG. 9, compared to the other modes, the engine rotational speed becomes higher at the same CVT output shaft rotational speed N2 corresponding to the same vehicle speed, and traveling with a higher torque can be enabled. In this case, even when the load with respect to the traveling becomes high during the use of the towing member 17, which is the working member as in the present embodiment, the towing work can be efficiently executed with high torque traveling. On the other hand, when the first economy mode (c in FIG. 9) or the second economy mode (d in FIG. 9) is commanded by the mode switching switch 150, compared to the case where the power mode or normal mode (b in FIG. 9) is commanded, the engine rotational speed becomes lower with the same CVT output shaft rotational speed N2 corresponding to the same vehicle speed, and power-save traveling can be enabled. In addition, in any of the modes, the reduction ratio N1/N2 of the continuously variable transmission device 68 is reduced as the vehicle speed is increased, and thus smooth acceleration traveling can be enabled without the need for frequent gear change operations by the user.

In the above description, a case is exemplified in which the switch command unit is the mode switching switch 150, but alternatively, the switch command unit may be of a volume type which can continuously adjust the speed relationship between the input shaft rotational speed N1 and the output shaft rotational speed N2. Alternatively, the switch command unit may be transmission lever switches HS, LS, NS, and RS which transmit the switch command signals corresponding to the position of the transmission lever 30 to the control deice 70. In this case, the speed relationship selecting unit 146 selects the map of the speed relationship according to the input of the switch command signals of the transmission lever switches HS and LS such that the reduction ratio N1/N2 of the continuously variable transmission device 68 is higher when a transmission gear of a lower stage gear is selected in the transmission gear device 48 than when a transmission gear of a higher stage gear is selected. For example, when the map of FIG. 9 is stored, the speed relationship selecting unit 146 selects the power mode of the wide solid line a with the selection of the transmission gear corresponding to the FL position, which is the lower gear stage, and selects the normal mode of the broken line b with the selection of the transmission gear corresponding to the FH position, which is the higher gear stage.

Alternatively, the speed relationship selecting unit 146 may select the map which is the one speed relationship according to the pedal position of the acceleration pedal 24 indicating the drive state of the vehicle during the travelling. For example, for the pedal position, a plurality of regions may be set between a fully opened position where the pedal is completely depressed and corresponding to the degree of opening of a throttle valve of 100%, and a non-operation position corresponding to the degree of opening of acceleration of 0%, and the map of the speed relationship may be correlated to each of the plurality of the regions. For example, the map of the normal mode may be correlated to a region of low degree of opening between the non-operation position and an intermediate depressed position, and the map of the power mode may be correlated to a region of high degree of opening between the intermediate depressed position and the fully opened position. With such a configuration, the speed relationship is automatically selected according to the drive state of the vehicle.

Alternatively, as shown in FIG. 2, a throttle opening sensor 152 may be provided for detecting the drive state of the vehicle during travelling. The throttle opening sensor 152 detects the degree of opening of the throttle valve of the engine 20, and transmits an opening signal indicating the detected degree of opening to the control device 70. In this case, the speed relationship selecting unit 146 selects the map of one speed relationship based on the input opening signal and the detected signal of the CVT input shaft rotational speed N1 which is the engine rotational speed signal of the CVT input shaft rotation sensor 90. For example, the transmission controller 147 estimates the axle load which is a load with respect to the axle based on the detected values of the degree of opening of the throttle valve and the CVT input shaft rotational speed N1, and controls the reduction ratio of the continuously variable transmission device 68 based on the magnitude of the axle load. For example, when the ratio N1/D1 of the input shaft rotational speed N1 with respect to the degree of opening D1 of the throttle valve is greater than or equal to a predetermined value which is set in advance, it is judged that the axle load is low, and the speed relationship selecting unit 146 selects the map of the normal mode. On the other hand, when the ratio N1/D1 is less than the predetermined value, it is judged that the axle load is high, and the speed relationship selecting unit 146 selects the map of the power mode. In the case of this configuration also, the speed relationship is automatically selected according to the drive state of the vehicle.

(Contents of Control in Alternative Configuration)

Figure 13:
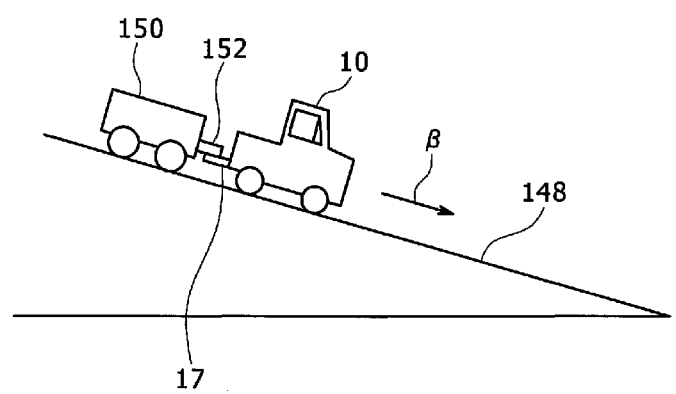
FIG. 13 is a schematic diagram showing a stopped state of a vehicle on an inclined road, for explaining an object of a continuously variable transmission control system for a vehicle according to an alternative configuration of a preferred embodiment of the present invention.

FIG. 13 is a schematic diagram showing a stopped state of the vehicle 10 on an inclined road 148, for explaining an object of the continuously variable transmission control system 12 for a vehicle according to an alternative configuration of a preferred embodiment of the present invention. The vehicle is equipped with the continuously variable transmission control system 12 of the above-described embodiment. After the user operates the brake pedal 26 or the parking brake lever 28 on the inclined road 148 and the vehicle 10 is stopped, when the user releases the brake pedal 26 or the parking brake lever 28 for re-start, even when the acceleration pedal 24 is not operated and the rotational speed of the engine 20 is at an idle speed, that is, a low speed, the vehicle slips due to the action of the force of gravity and is lowered in the direction of β in FIG. 13, and the vehicle speed is increased. In this case, with the increase in the vehicle speed, the reduction ratio of the continuously variable transmission device 68 is reduced. Because of this, there may be cases where it becomes difficult to effectively apply the engine brake and maintain the vehicle speed at a low speed.

Similarly to the above-described embodiment shown in FIG. 2, the present configuration includes the CVT output shaft rotation sensor 94 and the control device 70. Further, the control device 70 judges, after brake OFF after the vehicle is stopped with brake ON, that is, after it is confirmed that the calculated vehicle speed calculated by the vehicle speed calculating unit 141 becomes 0, and with the acceleration OFF, whether or not the calculated vehicle speed is greater than or equal to a predetermined vehicle speed Va which is set in advance. In this case, the predetermined vehicle speed Va is higher than a vehicle speed Vf at which the normal maximum reduction ratio is realized by the continuously variable transmission device 68. When the calculated vehicle speed is greater than or equal to the predetermined vehicle speed Va after the brake is set to OFF and acceleration is set to OFF after the vehicle is stopped, the transmission control unit 147 moves the first moveable sheave 110 so that the normal maximum reduction ratio Na is realized at the continuously variable transmission device 68.

Figure 14:
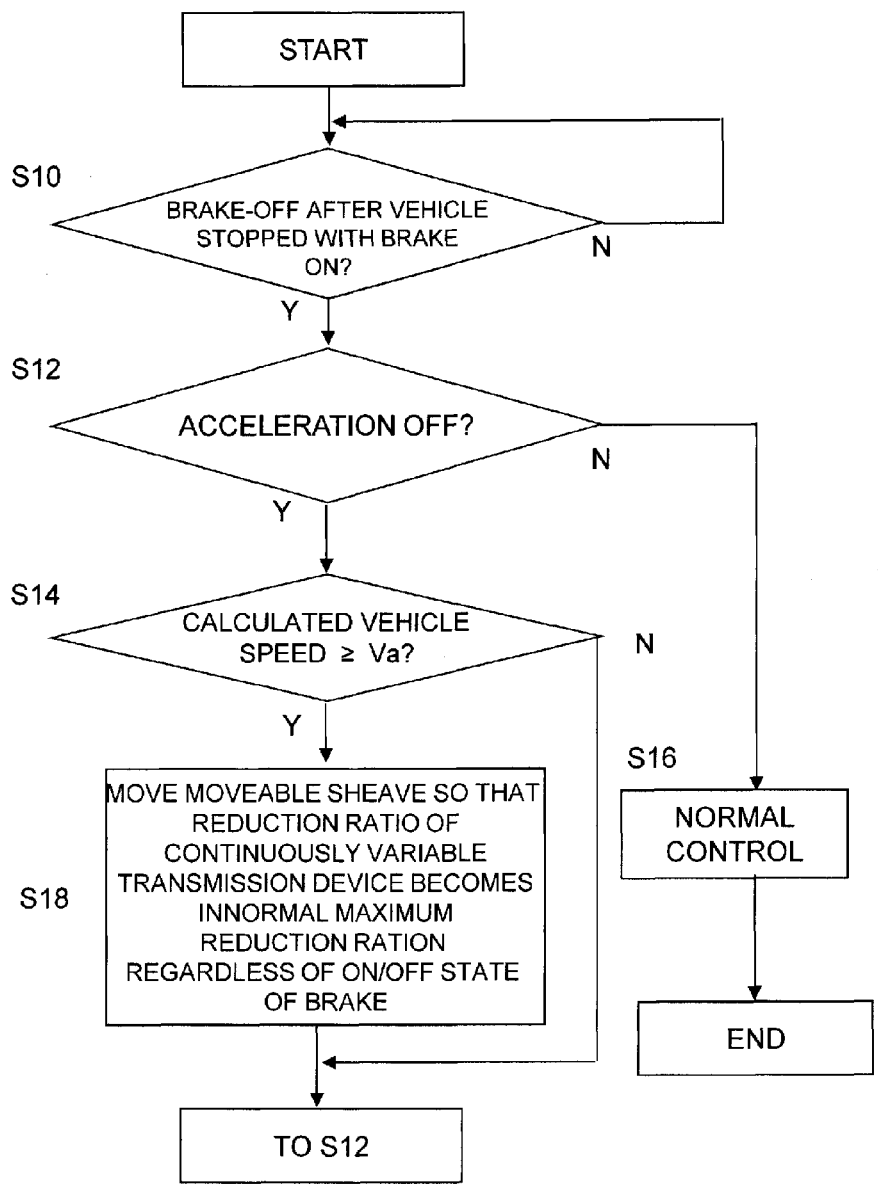
FIG. 14 is a flowchart showing a reduction ratio control method after braking is released after the vehicle is stopped in the continuously variable transmission control system for a vehicle according to an alternative configuration of a preferred embodiment of the present invention.

FIG. 14 is a flowchart showing a reduction ratio control method after the vehicle is stopped and then the brake is released in the structure of the present configuration. As shown in the flowchart, in step S10 (hereinafter, step S will simply be referred to as S), the control device 70 judges whether or not the vehicle is stopped with the brake ON and then the brake is set to OFF. If the result of judgment in S10 is positive, the control device 70 judges whether or not the acceleration is OFF in S12. When the result of judgment in S12 is positive, the calculated vehicle speed is checked in S14, to judge whether or not the calculated vehicle speed is increased to a speed greater than or equal to the predetermined vehicle speed Va which is set in advance, and which is higher than the vehicle speed Vf corresponding to the normal maximum reduction ratio Na of the continuously variable transmission device 68. When the control device 70 judges that the calculated vehicle speed is increased to a speed greater than or equal to the predetermined vehicle speed Va in S14, the process proceeds to S18. In S18, the transmission controller 147 of the control device 70 controls the continuously variable transmission device 68 including the electricity-driven actuator 106 to move the first moveable sheave 110 (S18) so that the normal maximum reduction ratio Na is realized at the continuously variable transmission device 68 regardless of the ON/OFF state of the brake, and the process returns to S12. On the other hand, when the result of judgment in S12 is negative, the process returns to the normal control in S16, in which the reduction ratio of the continuously variable transmission device 68 is reduced as the vehicle speed is increased. When the result of judgment in S14 is negative, the process returns to S12 without going through S18.

Figure 15:
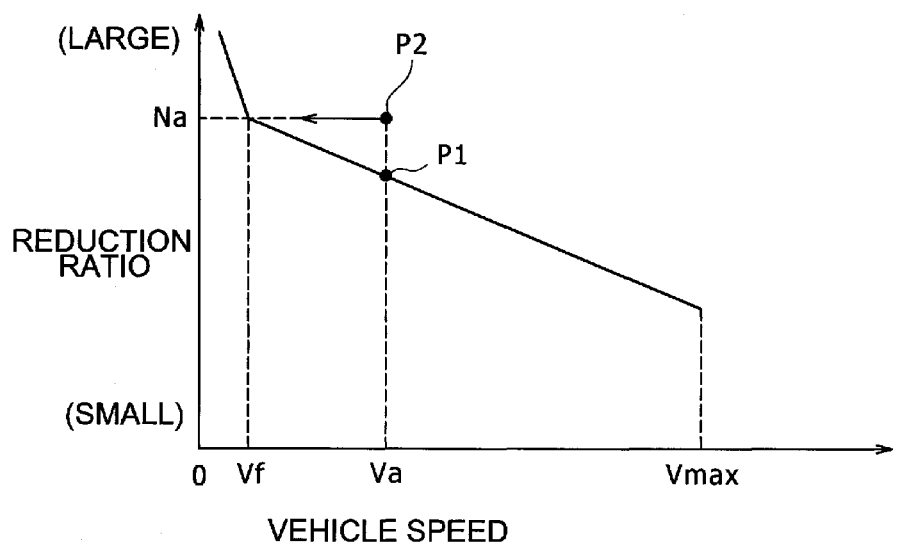
FIG. 15 is a diagram showing an example relationship between a vehicle speed and a reduction ratio when the gear-reduction control method of FIG. 14 is executed.

According to such a structure, in the case as described above in which the vehicle 10 is stopped on the inclined road 148 with the brake ON and then brake is set to OFF, even when the vehicle 10 slips down and the vehicle speed is increased due to the inclination of the road 148, the vehicle speed can be easily maintained at a low speed. FIG. 15 shows an example relationship between the vehicle speed and the reduction ratio when the gear-reduction control method of FIG. 14 is executed. The vehicle speed is increased due to the brake being OFF from the state of the vehicle speed of 0 where the vehicle is stopped on the inclined road, and with the increase in the vehicle speed, the reduction ratio of the continuously variable transmission device 68 is reduced from the normal maximum-reduction ratio Na. On the other hand, when the vehicle speed becomes greater than or equal to the predetermined vehicle speed Va, the vehicle transitions from P1 to P2 in FIG. 15, and the reduction ratio of the continuously variable transmission device 68 is returned to the normal maximum reduction ratio Na. Because of this, the influence of the change of the rotational speed of the engine 20 regarding to the rotational speed of the wheel becomes high, and it becomes easier to effectively apply the engine brake and maintain the vehicle speed at a low speed. On the other hand, with the acceleration set to ON, the control of the continuously variable transmission device 68 returns to the normal control. The other structures and operations are similar to those of the structure of FIGs. 1-10 described above.

(Contents of Control of Second Alternative Configuration)

Figure 16:
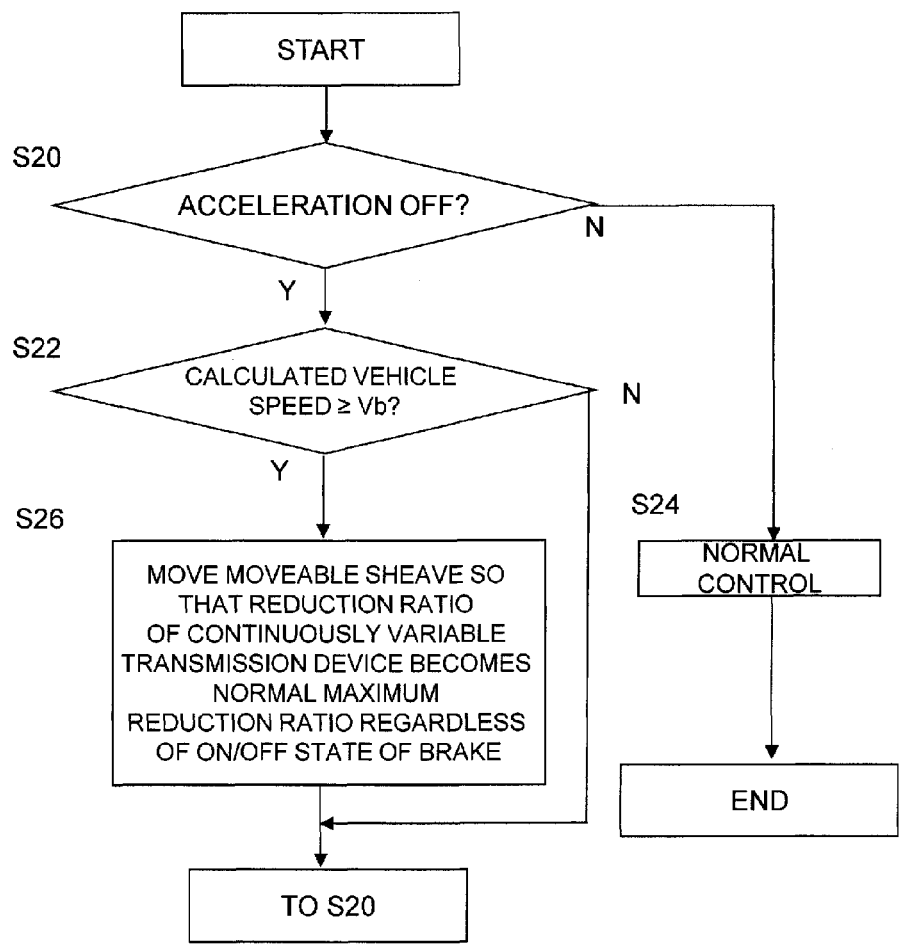
FIG. 16 is a flowchart showing a reduction ratio control method after an acceleration pedal is set to a non-operation state during travel of the vehicle in a continuously variable transmission control system for a vehicle according to a second alternative configuration of a preferred embodiment of the present invention.

FIG. 16 is a flowchart showing a reduction ratio control method after the acceleration is set to OFF during traveling of the vehicle in the continuously variable transmission control system 12 for a vehicle of a second alternative configuration of the preferred embodiment of the present invention. The structure of the present configuration is targeted to effectively apply the engine brake when the acceleration is set to OFF during traveling of the vehicle 10 on an inclined road and the calculated vehicle speed is greater than or equal to a predetermined vehicle speed which is set in advance.

Referring to FIG. 2, in the structure of the present configuration, the control device 70 judges whether or not the vehicle is in the acceleration OFF state and the calculated vehicle speed is greater than or equal to a predetermined vehicle speed Vb which is set in advance. When the result of the judgment is positive, the transmission controller 147 moves the first moveable sheave 110 so that the normal maximum reduction ratio Na is realized by the continuously variable transmission device 68.

As shown in the flowchart of FIG. 16, in S20, the control device 70 judges whether or not the vehicle is in the acceleration OFF state. When the vehicle is in the acceleration OFF state, the control device 70 checks the calculated vehicle speed in S22, and judges whether or not the calculated vehicle speed is increased to a speed greater than or equal to the predetermined vehicle speed Vb which is set in advance. When the control device 70 judges in S22 that the calculated vehicle speed is increased to a speed greater than or equal to the predetermined vehicle speed Vb, the process transitions to S26. In S26, the transmission controller 147 controls the continuously variable transmission device 68 to move the first moveable sheave 110 (S26) so that the normal maximum reduction ratio Na is realized at the continuously variable transmission device 68 regardless of the brake ON/OFF state. On the other hand, when the result of judgment in S20 is negative, the control returns to the normal control in S24, in which the reduction ratio of the continuously variable transmission device 68 is reduced as the vehicle speed increases. When the result of judgment in S22 is negative, the process returns to S20 without going through S26.

According to this configuration, although the vehicle speed increases due to the action of the force of gravity even in the acceleration OFF state during traveling of the vehicle 10 on the inclined road, the increase of the vehicle speed can be easily suppressed. The other structures and operations are similar to those of the structure of FIGS. 1-10 described above or the structure of FIGS. 14 and 15 described above.

(Contents of Control of Third Alternative Configuration)

Figure 17:
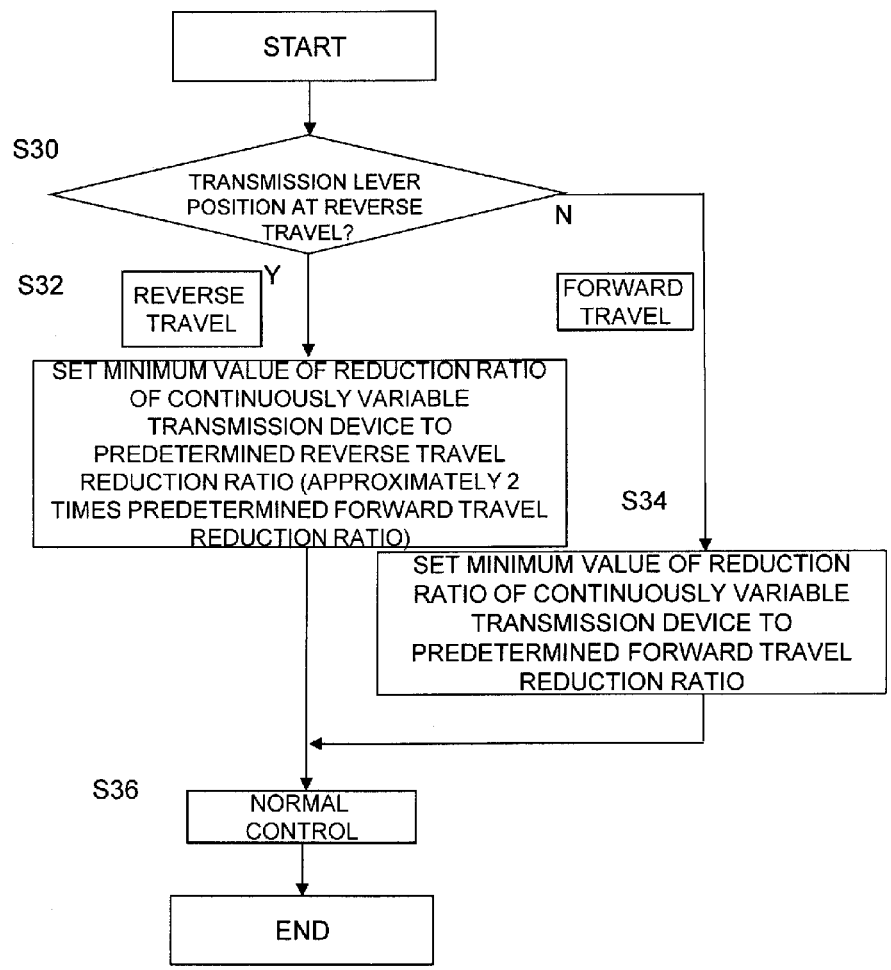
FIG. 17 is a flowchart showing a reduction ratio control method in a case where a transmission lever is switched to a reverse travel position in a continuously variable transmission control system for a vehicle according to a third alternative configuration of a preferred embodiment of the present invention.
Figure 18:
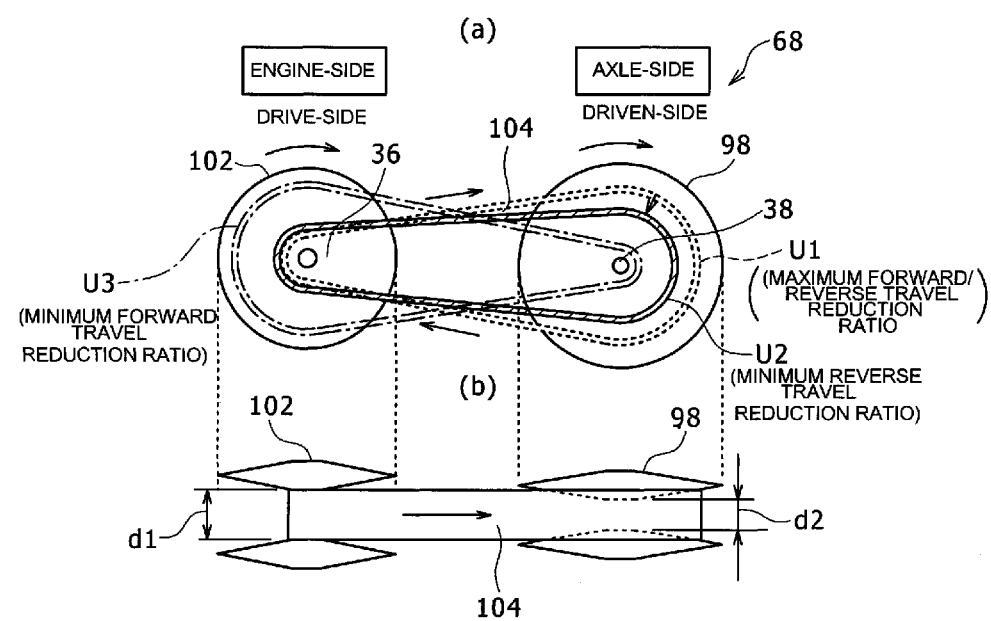
FIG. 18 shows a schematic cross sectional view (a) showing a winding state of a belt between two pulleys when a minimum reduction ratio is realized during reverse travel in the third alternative configuration of a preferred embodiment of the present invention, and a view (b) of (a) viewed from the above.

FIG. 17 is a flowchart showing a reduction ratio control method when the transmission lever 30 is switched to the R position which is a reverse travel position in the continuously variable transmission control system 12 for a vehicle according to a third alternative configuration of the preferred embodiment of the present invention. FIG. 18 shows a winding state of the belt 104 between the pulleys 102 and 98 when the minimum reduction ratio during the reverse travel in the third alternative configuration is realized. The structure of the present configuration, as shown with reference to FIGS. 1 and 2, is targeted to reduce the manufacturing cost of the transmission gear device 48 and to being set maximum speed during reverse travel lower than the maximum speed during forward travel when gears of the same reduction ratio are used for each gear for forward travel and reverse travel in the transmission gear mechanism 48 which changes rotational speed of the output of the continuously variable transmission device 68.

In the structure of the present configuration, the control device 70 judges whether or not the operation position of the transmission lever 30 is at the R position based on the detection signals of the transmission lever switches HS, LS, NS, and RS. When it is detected that the operation position of the transmission lever 30 is at the R position, the transmission controller 147 first moves the first moveable sheave 110 so that the normal maximum reduction ratio Na is realized at the continuously variable transmission device 68, and then sets a minimum value of the reduction ratio of the continuously variable transmission device 68 in the storage unit to a predetermined reverse travel reduction ratio which is set in advance. The predetermined reverse travel reduction ratio is set between a predetermined forward travel reduction ratio which is a minimum reduction ratio during forward travel and the normal maximum reduction ratio Na. For example, the predetermined reverse travel reduction ratio is approximately 2 times the predetermined forward travel reduction ratio. The normal maximum reduction ratio Na is the same for the forward travel and the reverse travel.

As shown in the flowchart of FIG. 17, in S30, the control device 70 judges whether or not the operation position of the transmission lever 30 is at the R position, and when the operation position of the transmission lever 30 is at the R position, the transmission controller 147 controls the continuously variable transmission device 68 to move the first moveable sheave 110 (S32) so that the normal maximum reduction ratio Na is realized at the continuously variable transmission device 68. In this case, the winding of the belt 104 between the pulleys 102 and 98 is at the position of a broken line U1 of FIG. 18. After the control of S32, the transmission controller 147 sets the minimum value of the reduction ratio of the continuously variable transmission device 68 to the predetermined reverse travel reduction ratio. On the other hand, when the result of the judgment in S30 is negative, the transmission controller 147 sets the minimum value of the reduction ratio of the continuously variable transmission device 68 to the predetermined forward travel reduction ratio. Then, in S36, the normal control is executed.

Figure 19:
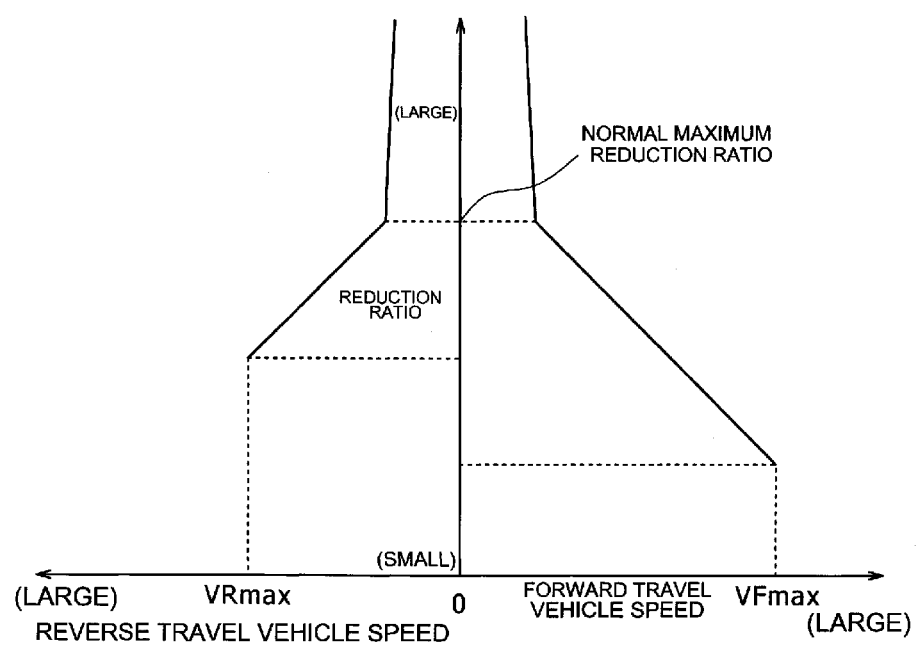
FIG. 19 is a diagram showing a relationship between forward and backward vehicle speeds and reduction ratio of the continuously variable transmission device in a third alternative configuration of a preferred embodiment of the present invention.

According to this structure, when the user operates the transmission lever 30 to switch the transmission lever 30 to the R position, first, the first moveable sheave 110 is moved so that the normal maximum reduction ratio Na of FIG. 4 described above is realized at the continuously variable transmission device 68. Then, with the increase of the vehicle speed, the reduction ratio is reduced, but the minimum value for the reduction ratio in this case is the predetermined reverse travel reduction ratio which is greater than the predetermined forward travel reduction ratio. In this case, the winding position of the belt 104 is a position shown by a solid line U2 of FIG. 18. On the other hand, when the minimum reduction ratio is reached during forward travel, the winding position of the belt 104 is the position shown by the dot-and-chain line U3 of FIG. 18. Because of this, in the relationship between the reduction ratio and the vehicle speeds of forward travel and reverse travel as shown in FIG. 19, the maximum vehicle speed VRmax during the reverse travel is lower than the maximum vehicle speed VFmax during forward travel. Further, such an advantage can be obtained without employing different gear-reduction ratios for the gears for the forward travel and the reverse travel in the transmission gear device 48. Because of this, gears of the same reduction ratio may be used for the gears for forward travel and for reverse travel in the transmission gear device 48, so that the manufacturing cost of the transmission gear device 48 can be reduced. A reduction ratio higher than the normal maximum reduction ratio in FIG. 19 is realized in a state where the belt slips with respect to the pulleys 102 and 98, and almost no motive power is transmitted between the pulleys 102 and 98. The other structures and operations are similar to those in any of the above-described configurations. In the above-described third alternative configuration, an alternative structure may be employed in which, in place of first moving the first moveable sheave 110 to realize the normal maximum reduction ratio Na at the continuously variable transmission device 68 when the user operates the transmission lever 30 to switch the lever position to the R position, the reduction ratio is returned to the reverse travel reduction ratio when the current reduction ratio is lower than the reverse travel reduction ratio. In this case, when the current reduction ratio is greater than the reverse travel reduction ratio, the minimum reduction ratio is set as the reverse travel reduction ratio, and the normal control is executed.

In the above-described configurations, the structure of the continuously variable transmission device 68 is not limited to the structure of FIG. 4, and various structures may be employed within the scope and spirit of the present invention. In addition, in the above, a case is described in which the pinching of the belt 104 is released by the drive pulley 102 when the brake is ON, but the above-described configurations are not limited to such a structure, and alternatively, a structure may be employed in which the pinched state of the belt 104 by the drive pulley 102 is constantly maintained regardless of the brake ON/OFF state, and the motive power transmission by the continuously variable transmission device 68 is maintained. In this case, for example, a centrifugal clutch mechanism may be provided between the CVT input shaft 36 and the drive pulley.

(Fourth Alternative Configuration)

FIG. 20 is a block diagram showing a structure of a continuously variable transmission control system according to a fourth alternative configuration of the preferred embodiment and equipped on the vehicle of FIG. 1. Unlike the embodiment shown in FIGS. 1-10, in the present configuration, the control device 70 does not have the speed relationship selecting unit 146. Alternatively, the speed relationship selecting unit 146 may be provided in the control device 70. Although the group of operation-side sensor switches 64 includes the mode switching switch 150, the mode switching switch 150 may be omitted.

The transmission lever 30 is supported on the vehicle body to allow tilting in the front-and-rear direction so that the transmission lever 30 can be switched among an F position which is a forward travel position, an N position which is a neutral position, and an R position which is a reverse travel position. In this case, with reference to FIG. 1, of the driven-side forward travel gear and the driven-side reverse travel gear placed around the second transmission shaft 58 of the transmission gear device 48, the driven-side forward travel gear engages the drive-side forward travel gear fixed on the first transmission shaft 49. The driven-side reverse travel gear engages the drive-side reverse travel gear fixed on the first transmission shaft 49 via an intermediate gear fixed on the reverse gear shaft (not shown).

With such a configuration, when the F position is selected by the displacement of the transmission lever 30, the clutch slider engages the driven-side forward travel gear and the vehicle 10 can travel forward. When the R position is selected, the clutch slider engages the driven-side reverse travel gear, and the vehicle can be made to travel in the reverse direction. When the N position is selected by the displacement of the transmission lever 30, the clutch slider is placed between the driven-side forward travel gear and the driven-side reverse travel gear, and the vehicle is set in the neutral state where the clutch slider does not engage either the driven-side forward travel gear or the driven-side reverse travel gear. In this case, the rotation of the CVT output shaft 38 is not transmitted to any of the front axles 40 and 42 or the rear axles 44 and 46.

Alternatively, similar to the structure of FIG. 2, a configuration of the transmission lever 30 may be employed in which switching among an FL position, which is a forward travel, low gear stage position, an FH position, which is a forward travel, high gear stage position, an N position, which is a neutral position, and an R position, which is a rear travel position is enabled, and the forward travel speed, can be switched between two stages.

Referring again to FIG. 20, the group of operation-side sensor switches 64 includes a key switch 74 which is a startup and stop command unit, and transmission lever switches FS, NS, and RS which are transmission command position detection units. The transmission lever switches FS, NS, and RS include a plurality of switches provided corresponding to the F, N, and R positions of the plurality of operation positions of the transmission lever 30. Each of the transmission lever switches FS, NS, and RS is switched ON when the transmission lever 30 is operated to the corresponding operation position, and is switched OFF when the transmission lever 30 is operated to a different position, to detect the operation position of the transmission lever 30.

Each of the key switch 74 and the transmission lever switches FS, NS, and RS transmits a signal indicating respective ON/OFF state to the control device 70. The brake pedal switch 78 transmits a brake command signal indicating a command of braking the vehicle to the control device 70 when the brake pedal switch obtains that the brake pedal 26 is operated by the user.

The control device power feed relay 82 is connected between the battery 66 and the control device 70, and the ON/OFF state thereof is controlled by a first relay controller 84, to be described later, of the control device 70. The control device power feed relay 82 is maintained in the ON state by maintaining of the ON command signal from the control device 70, and is switched OFF by the disconnection of the ON command signal.

The startup unit power feed relay 86 is connected between the battery 66 and the engine startup unit 34, and the ON/OFF state thereof is controlled by a second relay controller 88, to be described later, of the control device 70. The startup unit power feed relay 86 is switched OFF when the ON command signal from the control device 70 is disconnected, and is switched ON by an input of the ON command signal from the control device 70.

Referring again to FIG. 2, the control device 70 includes a microcomputer having a CPU and a storage unit such as a memory, and also has a vehicle speed calculating unit 141, an engine controller (not shown), a transmission controller 147, a judging unit 160, a belt pinching releasing unit 158, the first relay controller 84, and the second relay controller 88.

The vehicle speed calculating unit 141 calculates the vehicle speed based on the output shaft rotational speed of the driven pulley 98 detected by the CVT output shaft rotation sensor 94, and the operation position of the transmission lever 30 detected by the transmission lever switches FS, NS, and RS. The transmission controller 147 controls the driving of the electric motor 126 of the electricity-driven actuator 106 through the actuator driver 72 according to the detected pedal position of the acceleration pedal 24 or a transmission pattern which is set in advance according to the detected pedal position and a detected value of the rotational speed of the engine 20. In the transmission pattern, the reduction ratio is reduced as the vehicle speed is increased. In the engine 20, control is applied so that the engine 20 is rotated at a constant rotational speed having a high efficiency during driving is maintained.

The judging unit 160 judges whether or not a brake command signal is input from the brake pedal switch 78 or the parking lever switch 80, that is, whether or not the brake is set to ON.

When the judging unit 160 judges that the brake is set to ON, the belt pinching releasing unit 158 sets the width between the moveable sheave and the fixed sheave of the drive pulley 102 to a width greater than or equal to a predetermined width which is set in advance, to release the pinching of the belt 104 by the fixed sheave 108 and the moveable sheave 110, as shown in FIG. 7 or 8. On the other hand, the control device 70 causes the first moveable sheave 110 to move toward the first fixed sheave 108 and the belt 104 to be in the pinched state according to the transmission pattern, when the brake is set to OFF.

When the key switch 74 is switched from ON to OFF by an operation of the user and in a motive power transmission state where the pinching of the belt 104 by the drive pulley 102 is maintained, the first relay controller 84 maintains the ON command signal to the control device power feed relay 82 and maintains the ON state. With this configuration, in a continued state of the motive power transmission by the belt 104 between the drive pulley 102 and the driven pulley 98, because the vehicle is in the brake OFF state, even when the key switch 74 is switched from ON to OFF, the control device 70 is maintained in the ON state.

On the other hand, when the key switch 74 is switched from ON to OFF and in a motive power transmission blocked state where the pinching of the belt 104 by the drive pulley 102 is released by the brake being ON, the control device 70 stops the engine 20 when the travelling of the vehicle is stopped. Then, the control device 70 disconnects the ON command signal to the control device power feed relay 82, to set the OFF state. With this configuration, when the key switch 74 is switched from ON to OFF and the motive power transmission by the belt 104 between the pulleys 102 and 98 is disconnected, the control device 70 stops the engine 20, and then, the power feed to the control device 70 is stopped, that is, the control device 70 is switched OFF when the travelling of the vehicle is stopped.

When the key switch 74 is switched from OFF to ON and in a motive power transmission state where the pinching of the belt 104 by the drive pulley 102 is maintained, the second relay controller 88 disconnects the ON command signal to the startup unit power feed relay 86 to set the OFF state. With this configuration, in a continued state of the motive power transmission by the belt 104 between the pulleys 102 and 98, even when the key switch 74 is switched from OFF to ON, the engine 20 is not started up.

On the other hand, when the key switch 74 is switched from OFF to ON and in the motive power transmission disconnected state where the pinching of the belt 104 by the drive pulley 102 is released, the second relay controller 84 inputs the ON command signal to the startup unit power feed relay 86, to set to the ON state. With this configuration, in the disconnected state of the transmission of the motive power by the belt 104 between the drive pulley 102 and the driven pulley 98, when the key switch 74 is switched from OFF to ON, the engine 20 is started up.

Alternatively, a configuration may be employed in which the control device 70 does not switch the control device power feed relay 82 OFF even when the key switch 74 is switched from ON to OFF, when the switching to the N position is detected by the detection signals from the transmission lever switches FS, NS, and RS, and establishment of the neutral state is detected by the detection signal from the neutral switch 92. Alternatively, a configuration may be employed in which the control device 70 does not switch the startup unit power feed relay 86 ON even when the key switch 74 is switched from OFF to ON, until the switching to the N position is detected by the detection signals from the transmission lever switches FS, NS, and RS, and the establishment of the neutral position is detected by the detection signal from the neutral switch 92.

According to the continuously variable transmission control system 12 described above, similar to the structure of FIGS. 1-10 described above, when the brake command signal is input from the brake pedal switch 78 or the parking lever switch 80 to the control device 70, the pinching of the belt 104 by the first moveable sheave 110 and the first fixed sheave 108 is released. Because of this, even when a deviation is caused between the reduction of the rotational speed of the engine 20 and the reduction of the rotational speed of the wheel when the vehicle is decelerated with the brake ON, friction between the CVT input shaft 36 and the drive pulley 102 and the belt 104 can be reduced.

In addition, the control device power feed relay 82 is connected between the battery 66 and the control device 70, and when the key switch 74 is switched from ON to OFF and in the motive power transmission state where the pinching of the belt 104 at the drive pulley 102 is maintained, the control device 70 maintains the ON command signal to the control device power feed relay 82. In addition, in the motive power transmission disconnected state where the pinching of the belt 104 by the drive pulley 102 is released, the ON command signal to the control device power feed relay 82 is disconnected. Because of this, when the key switch 74 is switched from ON to OFF, the activation of the control device 70 is continued in a state where the motive power transmission between the drive pulley 102 and the driven pulley 98 is continued. The control device power feed relay 82 is switched OFF, the power feed from the battery 66 to the control device 70 is stopped, and the system of the vehicle is switched OFF only in the state where the brake pedal 26 or the parking brake lever 28 is operated and the pinching of the belt 104 at the drive pulley 102 is released. Because of this, even when the engine 20 is erroneously started up in a state where the transmission gear device 48 is in the neutral state during failure of the transmission lever switches FS, NS, and RS or the neutral switch 92, because the motive power transmission at the continuously variable transmission device 68 is disconnected, unintended sudden movement of the vehicle 10 can be prevented.

Moreover, the startup unit power feed relay 86 is connected between the battery 66 and the engine startup unit 34, and when the key switch 74 is switched from OFF to ON and in the motive power transmission state in which the pinching of the belt 104 at the drive pulley 102 is maintained, the control device 70 disconnects the ON command signal to the startup unit power feed relay 86. In addition, in the motive power transmission disconnected state in which the pinching of the belt 104 at the drive pulley 102 is released, the ON command signal is input to the startup unit power feed relay 86. Because of this, the engine 20 is not started up when the key switch 74 is switched from OFF to ON while the motive power transmission between the drive pulley 102 and the driven pulley 98 is maintained. Therefore, even during failure of the transmission lever switches FS, NS, and RS or the neutral switch 92, the engine is not started up in the state where the motive power transmission between the engine 20 and the front wheel 14 and the rear wheel 16 maintained, and thus, unintended sudden movement of the vehicle can be prevented.

As an alternative configuration of the above-described preferred embodiment of the present invention, a structure may be employed in which the judging unit 160 of the continuously variable transmission control system 12 judges whether or not the brake command signal from the brake pedal switch 78 or the parking lever switch 80 is input and whether or not a specific condition that the calculated vehicle speed is lower than or equal to a predetermined speed which is set in advance is satisfied. In this case, the continuously variable transmission device 68 is controlled such that the belt pinching releasing unit 158 releases the pinching of the belt 104 at the drive pulley 102 only when the brake command signal is input and the condition that the calculated vehicle speed is lower than or equal to the predetermined speed is satisfied.

When such a structure is employed, until the vehicle speed of the vehicle 10 becomes lower than or equal to the predetermined speed by a means including the engine brake, even when the brake pedal 26 or the parking brake lever 28 is operated, the pinching of the belt 104 by the drive pulley 102 is not released. Therefore, when the brake pedal 26 or the parking brake lever 28 is operated in a state of high vehicle speed, the engine brake can be effectively applied, and the vehicle 10 can be efficiently decelerated.

The continuously variable transmission control system 12 of at least one of the above-described configurations has the structure of the continuously variable transmission control system for a vehicle according to the first aspect of the present invention, and at least one of the above-described configuration of vehicle has the structure of the work vehicle according to the present invention. Therefore, in the control device, one speed relationship is selected based on the input of the switch command signal indicating a command of switching of the speed relationship or the drive state of the vehicle, and the width between the moveable sheave and the fixed sheave is changed by driving the electricity-driven actuator based on the selected one speed relationship and detected values of the input shaft rotational speed of the drive pulley and the output shaft rotational speed of the driven pulley. Because of this, the speed relationship can be switched among a plurality of speed relationships for the rotational speeds of the drive pulley and the driven pulley without the need for a switching structure for a plurality of torque cam mechanisms.

The continuously variable transmission control system according to at least one of the above-described configurations has the structure of the continuously variable transmission control system for a vehicle according to the second aspect of the present invention. Therefore, the pinching of the belt at one pulley among the drive pulley and the driven pulley is released when the brake command signal is input from the brake command unit to the control device, or when the brake command signal is input from the brake command unit to the control device and a preset specific condition is satisfied. Because of this, wearing of the belt when the user executes the brake operation can be reduced, and the centrifugal clutch does not need to be provided.

What is claimed is:

1. A continuously variable transmission control system for a vehicle, comprising:
    a continuously variable transmission device having a belt, that is suspended between a drive pulley on a side of a motive power source and a driven pulley on a side of a wheel, and an electricity-driven actuator, at least one pulley, of the drive pulley and the driven pulley, including a fixed sheave and a moveable sheave placed to be moveable with respect to the fixed sheave, and the electricity-driven actuator changing an width between the moveable sheave and the fixed sheave by movement of the moveable sheave;
    a control device that controls driving of the electricity-driven actuator;
    an input rotation detection unit that detects an input shaft rotational speed of the drive pulley; and
    an output rotation detection unit that detects an output shaft rotational speed of the driven pulley, wherein
    the control device selects, from a plurality of speed relationships, each of which is a relationship between the input shaft rotational speed and the output shaft rotational speed, one speed relationship according to an input of a switch command signal indicating a command of switching of the speed relationship or a drive state of the vehicle, and changes the width between the moveable sheave and the fixed sheave based on the selected one speed relationship and detected values of the input shaft rotational speed and the output shaft rotational speed.

2. The continuously variable transmission control system for a vehicle according to claim 1, wherein
    the control device changes the width between the moveable sheave and the fixed sheave so that a relationship between the detected values of the input shaft rotational speed and the output shaft rotational speed reaches or coincides with the selected one speed relationship.

3. The continuously variable transmission control system for a vehicle according to claim 1, wherein
the control device has a storage unit that stores the plurality of the speed relationships as a plurality of maps.

4. The continuously variable transmission control system for a vehicle according to claim 1, further comprising
a switch command unit that detects that an operation unit is operated by a user and transmits the switch command signal to the control device, wherein
the control device selects the one speed relationship according to the input of the switch command signal.

5. The continuously variable transmission control system for a vehicle according to claim 4, wherein
the operation unit is a transmission lever which can select one of two transmission gears as a low stage gear and a high stage gear as a result of an operation by the user,
the switch command unit is a lever position detection unit that transmits the switch command signal corresponding to a position of the transmission lever to the control device, and
the control device selects the speed relationship according to the input of the switch command signal such that a ratio of the input shaft rotational speed with respect to the output shaft rotational speed is higher when the low stage gear is selected than when the high stage gear is selected.

6. The continuously variable transmission control system for a vehicle according to claim 1, further comprising
an acceleration command detection unit that detects an acceleration operation position of an acceleration command unit which indicates a drive state of the vehicle during a travelling, and transmits an acceleration operation position signal to the control device, wherein
the control deice selects the one speed relationship according to the input acceleration operation position signal and the detected values of the input shaft rotational speed and the output shaft rotational speed.

7. The continuously variable transmission control system according to claim 1, further comprising:
a throttle opening detection unit that detects, as a drive state of the vehicle, a degree of opening of a throttle valve of an engine, which is the motive power source, and transmits an opening signal to the control device; and
an engine rotation sensor that detects, as a drive state of the vehicle, a rotational speed of the engine, and transmits an engine rotational speed signal to the control device, wherein
the control device selects the one speed relationship according to the input opening signal and the input engine rotational speed signal.

8. A work vehicle comprising:
a working member which a load is applied to with respect to traveling during work; and
the continuously variable transmission control system for a vehicle according to claim 1, wherein
the continuously variable transmission device is connected between the motive power source and the wheel in a manner to enable transmission of the motive power.

9. The work vehicle according to claim 8, further comprising:
a transmission gear device including two transmission gears as a low stage gear and a high stage gear that are selectively connected between the driven pulley and the wheel;
a transmission lever that can select the transmission gear to be connected between the driven pulley and the wheel as a result of an operation by the user; and
a lever position detection unit that transmits a switch command signal corresponding to a position of the transmission lever to the control device, wherein
the control device selects the speed relationship according to the input of the switch command signal so that a ratio of the input shaft rotational speed with respect to the output shaft rotational speed is higher when the low stage gear is selected than when the high stage gear is selected.

10. A continuously variable transmission control system for a vehicle, comprising:
a continuously variable transmission device having a belt, that is suspended between a drive pulley on a side of a motive power source and a driven pulley on a side of a wheel, and an electricity-driven actuator, at least one pulley, of the drive pulley and the driven pulley, including a fixed sheave and a moveable sheave placed to be moveable with respect to the fixed sheave, and the electricity-driven actuator changing an width between the moveable sheave and the fixed sheave by movement of the moveable sheave;
a control device that controls driving of the electricity-driven actuator; and
a brake command unit that transmits a brake command signal indicating a command of braking of the vehicle or maintaining the brake to the control device when a brake operation unit is operated by a user, wherein
the control device, when the brake command signal is input from the brake command unit or when the brake command signal is input from the brake command unit and a preset specific condition is satisfied, sets the width between the moveable sheave and the fixed sheave to a width of greater than or equal to a predetermined width, to release pinching of the belt at the one pulley.

11. The continuously variable transmission control system for a vehicle according to claim 10, further comprising:
an output shaft rotational speed detection unit that detects an output shaft rotational speed of the driven pulley and outputs a signal indicating a detected value of the output shaft rotational speed to the control device; and
a transmission command position detection unit that detects an operation position of a transmission command unit and transmits a signal indicating the operation position to the control device, wherein
the control device releases the pinching of the belt at the one pulley when the brake command signal is input from the brake command unit, and a condition that a vehicle speed calculated by the detected value of the output shaft rotational speed and the detected value of the operation position of the transmission command unit is lower than or equal to a predetermined speed is satisfied as the specific condition.

12. The continuously variable transmission control system for a vehicle according to claim 10, further comprising:
a startup and stop command unit, that is switched between an ON state and an OFF state according to a manual operation of the user and that transmits a signal indicating the ON/OFF state to the control device;
a power supply that supplies electric power to the control device; and
a control device power feed relay, that is connected between the power supply and the control device, that is maintained in an ON state while an ON command signal from the control device is maintained, and, that is switched OFF when the ON command signal is disconnected, wherein when the startup and stop command unit is switched from the ON state to the OFF state, in a motive power transmission state in which the pinching of the belt at the one pulley is maintained, the control device maintains the ON command signal to the control device power feed relay, and, in a motive power transmission disconnected state in which the pinching of the belt at the one pulley is released, the control device disconnects the ON command signal to the control device power feed relay.

13. The continuously variable transmission control system for a vehicle according to claim 10, further comprising:

a startup and stop command unit, that is switched between an ON state and an OFF state as a result of a manual operation by the user, and that transmits a signal indicating the ON/OFF state to the control device;

a power supply that supplies electric power to the control device;

an engine startup unit that starts up an engine, which is the motive power source, by supply of electric power; and a startup unit power feed relay, that is connected between the power supply and the engine startup unit, that is switched OFF when an ON command signal from the control device is disconnected, and, that is switched ON when the ON command signal is input from the control device, wherein when the startup and stop command unit is switched from the OFF state to the ON state, in a motive power transmission state in which the pinching of the belt at the one pulley is maintained, the control device disconnects the ON command signal to the startup unit power feed relay, and, in a motive power transmission disconnected state in which the pinching of the belt at the one pulley is released, the control device inputs the ON command signal to the startup unit power feed relay.

* * * * *